(12) United States Patent
Bechtel et al.

(10) Patent No.: US 8,219,217 B2
(45) Date of Patent: *Jul. 10, 2012

(54) VARIABLE TRANSMISSION WINDOW CONSTRUCTIONS

(75) Inventors: Jon H. Bechtel, Holland, MI (US); David L. Poll, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/884,852

(22) Filed: Sep. 17, 2010

(65) Prior Publication Data

US 2011/0046810 A1   Feb. 24, 2011

Related U.S. Application Data

(60) Continuation of application No. 12/429,259, filed on Apr. 24, 2009, now Pat. No. 7,822,490, which is a continuation of application No. 11/461,098, filed on Jul. 31, 2006, now Pat. No. 7,542,809, which is a continuation of application No. 10/989,472, filed on Nov. 16, 2004, now Pat. No. 7,085,609, which is a division of application No. 10/411,564, filed on Apr. 10, 2003, now Pat. No. 6,829,511, which is a division of application No. 09/624,792, filed on Jul. 25, 2000, now Pat. No. 6,567,708.

(51) Int. Cl.
*G05B 11/01* (2006.01)
*G05B 19/18* (2006.01)
*G02F 1/153* (2006.01)

(52) U.S. Cl. ............ 700/19; 700/3; 700/20; 359/275

(58) Field of Classification Search ............ 700/2, 3, 700/9, 19, 20, 33, 80, 293; 359/265, 275; 52/173.3

See application file for complete search history.

(56) References Cited

U.S. PATENT DOCUMENTS

| 3,760,359 | A | * | 9/1973 | McQuown, Jr. | 340/534 |
| 4,734,844 | A | * | 3/1988 | Rhoads | 363/72 |
| 4,893,908 | A | | 1/1990 | Wolf et al. | |
| 4,917,477 | A | | 4/1990 | Bechtel et al. | |

(Continued)

FOREIGN PATENT DOCUMENTS

WO   WO 9204522 A1 * 3/1992

(Continued)

OTHER PUBLICATIONS

Tsang, P.W.M. et al., "Development of a Distributive Lighting Control System Using Local Operating Network," IEEE Transactions on Consumer Electronics, 40 (1994).

*Primary Examiner* — M. N. Von Buhr

(74) *Attorney, Agent, or Firm* — Price Heneveld LLP; Scott P. Ryan

(57) ABSTRACT

An electrical control system is disclosed for controlling a plurality of variable transmittance windows. The electrical control system of the present invention comprises a master control circuit for supplying control signals representing transmittance levels for the variable transmission windows, and a plurality of window control circuits coupled to each of the master control circuits. Because the window control circuits can sense abnormal load conditions in the variable transmission windows, the system further includes an interface to a security system to inform of a potential intrusion. Each window control circuit controls the transmittance of at least one of the variable transmission windows in response to control signals received from the master control circuit.

20 Claims, 13 Drawing Sheets

U.S. PATENT DOCUMENTS

| | | | |
|---|---|---|---|
| RE33,343 E | 9/1990 | Bitter et al. | |
| 4,958,917 A | 9/1990 | Hashimoto et al. | |
| 4,972,176 A | 11/1990 | Vallance | |
| 5,004,961 A * | 4/1991 | Berner et al. | 318/65 |
| 5,066,111 A | 11/1991 | Singleton et al. | |
| 5,076,673 A | 12/1991 | Lynam et al. | |
| 5,092,939 A | 3/1992 | Nath et al. | |
| 5,099,624 A * | 3/1992 | Valentin | 52/207 |
| 5,124,832 A | 6/1992 | Greenberg et al. | |
| 5,136,419 A | 8/1992 | Shabrang | |
| 5,161,048 A | 11/1992 | Rukavina | |
| 5,228,925 A | 7/1993 | Nath et al. | |
| 5,244,709 A | 9/1993 | Vanderstukken | |
| 5,285,137 A * | 2/1994 | Midas et al. | 318/280 |
| 5,319,514 A * | 6/1994 | Walsh et al. | 361/59 |
| 5,384,578 A | 1/1995 | Lynam et al. | |
| 5,384,653 A | 1/1995 | Benson et al. | |
| 5,532,560 A * | 7/1996 | Element et al. | 318/266 |
| 5,589,958 A | 12/1996 | Lieb | |
| 5,612,847 A * | 3/1997 | Malecke et al. | 361/58 |
| 5,654,736 A | 8/1997 | Green et al. | |
| 5,657,149 A | 8/1997 | Buffat et al. | |
| 5,671,387 A | 9/1997 | Jacobs et al. | |
| 5,675,487 A * | 10/1997 | Patterson et al. | 700/56 |
| 5,724,176 A | 3/1998 | Nishikitani et al. | |
| 5,725,809 A | 3/1998 | Varaprasad et al. | |
| 5,805,330 A | 9/1998 | Byker et al. | |
| 5,838,483 A | 11/1998 | Teowee et al. | |
| 5,889,608 A | 3/1999 | Buffat et al. | |
| 5,923,457 A | 7/1999 | Byker et al. | |
| 5,940,150 A | 8/1999 | Faris et al. | |
| 5,940,216 A | 8/1999 | Gibbs | |
| 5,962,992 A * | 10/1999 | Huang et al. | 315/312 |
| 5,973,819 A | 10/1999 | Pletcher et al. | |
| 5,978,126 A | 11/1999 | Sjursen | |
| 6,020,989 A | 2/2000 | Watanabe | |
| 6,039,390 A * | 3/2000 | Agrawal et al. | 296/211 |
| 6,045,724 A | 4/2000 | Varaprasad et al. | |
| 6,055,089 A | 4/2000 | Schulz et al. | |
| 6,056,410 A | 5/2000 | Hoekstra et al. | |
| 6,084,702 A | 7/2000 | Byker et al. | |
| 6,089,721 A * | 7/2000 | Schierbeek | 359/603 |
| 6,094,306 A * | 7/2000 | Jain | 359/568 |
| 6,142,639 A * | 11/2000 | Jain et al. | 359/603 |
| 6,157,024 A * | 12/2000 | Chapdelaine et al. | 250/221 |
| 6,166,496 A * | 12/2000 | Lys et al. | 315/316 |
| 6,210,008 B1 | 4/2001 | Hoekstra et al. | |
| 6,239,898 B1 | 5/2001 | Byker et al. | |
| 6,245,262 B1 | 6/2001 | Varaprasad et al. | |
| 6,246,505 B1 * | 6/2001 | Teowee et al. | 359/241 |
| 6,254,003 B1 | 7/2001 | Pettinelli et al. | |
| 6,280,041 B1 * | 8/2001 | Unger et al. | 359/604 |
| 6,297,900 B1 | 10/2001 | Tulloch et al. | |
| 6,396,408 B2 | 5/2002 | Drummond et al. | |
| 6,407,847 B1 | 6/2002 | Poll et al. | |
| 6,493,128 B1 | 12/2002 | Agrawal et al. | |
| 6,501,457 B1 | 12/2002 | Bruechmann et al. | |
| 6,515,377 B1 * | 2/2003 | Ubelein et al. | 307/10.1 |
| 6,528,782 B1 | 3/2003 | Zhang et al. | |
| 6,542,076 B1 * | 4/2003 | Joao | 340/539.14 |
| 6,567,708 B1 * | 5/2003 | Bechtel et al. | 700/19 |
| 6,574,515 B1 | 6/2003 | Kirkpatrick et al. | |
| 6,594,067 B2 | 7/2003 | Poll et al. | |
| 6,671,080 B2 | 12/2003 | Poll et al. | |
| 6,829,511 B2 * | 12/2004 | Bechtel et al. | 700/19 |
| 6,904,348 B2 | 6/2005 | Drummond et al. | |
| 6,965,813 B2 * | 11/2005 | Granqvist et al. | 700/276 |
| 7,085,609 B2 * | 8/2006 | Bechtel et al. | 700/19 |
| 7,154,657 B2 * | 12/2006 | Poll et al. | 359/265 |
| 7,535,614 B1 | 5/2009 | Tapley et al. | |
| 7,542,809 B2 * | 6/2009 | Bechtel et al. | 700/19 |
| 7,822,490 B2 * | 10/2010 | Bechtel et al. | 700/19 |
| 7,990,603 B2 * | 8/2011 | Ash et al. | 359/275 |
| 2004/0160319 A1 * | 8/2004 | Joao | 340/539.1 |
| 2006/0200782 A1 * | 9/2006 | Obradovich | 715/835 |
| 2007/0285759 A1 | 12/2007 | Ash et al. | |
| 2008/0234878 A1 * | 9/2008 | Joao | 701/2 |
| 2008/0266389 A1 * | 10/2008 | DeWind et al. | 348/115 |
| 2011/0255142 A1 * | 10/2011 | Ash et al. | 359/275 |

FOREIGN PATENT DOCUMENTS

| | | |
|---|---|---|
| WO | 9905566 | 2/1999 |

* cited by examiner

Signal waveform:

Idle waveform:

Instruction from master with no data:

Instruction from master with data write:

Instruction from master with data read:

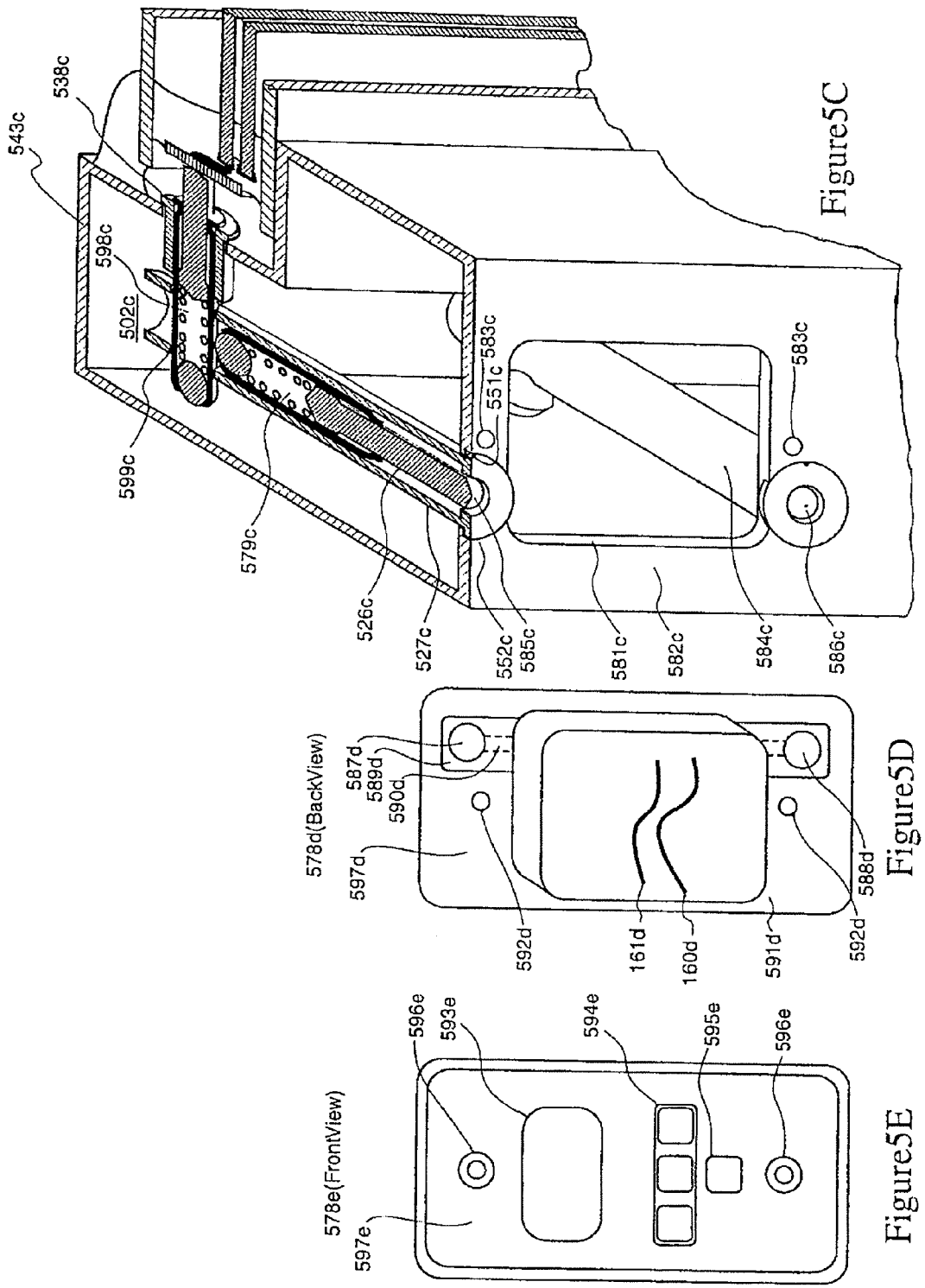

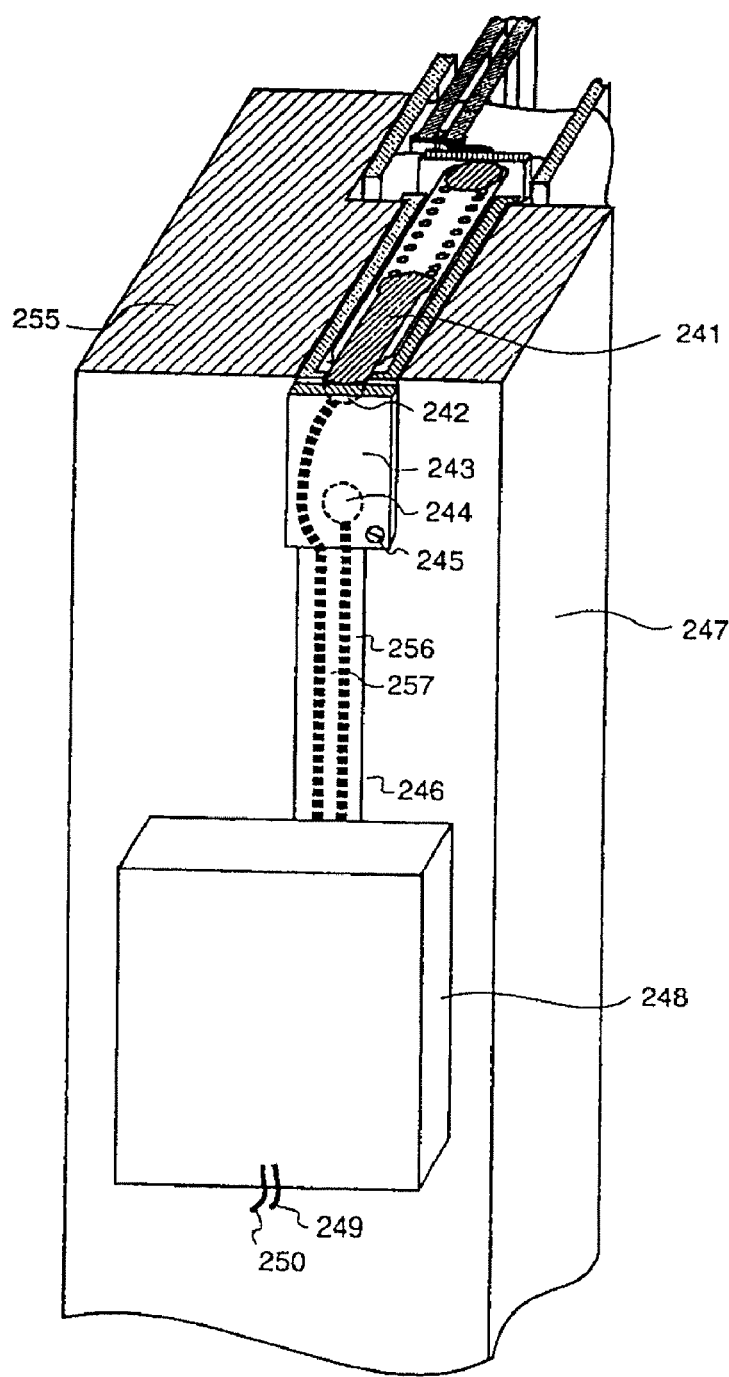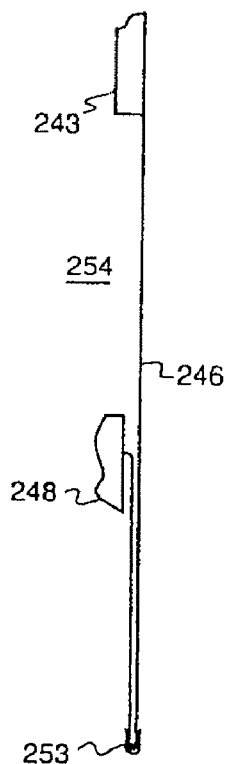
Figure 8A
Figure 8B

VARIABLE TRANSMISSION WINDOW CONSTRUCTIONS

CROSS-REFERENCE TO RELATED APPLICATIONS

This application is a continuation of U.S. patent application Ser. No. 12/429,259, filed Apr. 24, 2009, now U.S. Pat. No. 7,822,490, which is a continuation of U.S. patent application Ser. No. 11/461,098, filed Jul. 31, 2006, now U.S. Pat. No. 7,542,809, which is a continuation of U.S. patent application Ser. No. 10/989,472, filed Nov. 16, 2004, now U.S. Pat. No. 7,085,609, which is a divisional of U.S. patent application Ser. No. 10/411,564, filed Apr. 10, 2003, now U.S. Pat. No. 6,829,511, which is a divisional of U.S. patent application Ser. No. 09/624,792, filed on Jul. 25, 2000, now U.S. Pat. No. 6,567,708, the entire disclosures of which are incorporated herein by reference.

BACKGROUND OF THE INVENTION

The present invention generally relates to variable transmission windows. More specifically, the present invention relates to control systems for controlling the transmission of variable transmission windows and to various constructions of variable transmission windows.

Variable transmittance light filters, such as electrochromic light filters, have been proposed for use in architectural windows, skylights, and in windows and sunroofs for automobiles. Such variable transmittance light filters reduce the transmittance of direct or reflected sunlight during daytime through the window, while not reducing such transmittance during nighttime. Not only do such light filters reduce bothersome glare and ambient brightness, but they also reduce fading and generated heat caused by the transmission of sunlight through the window.

Variable transmission windows have not been widely accepted commercially for several reasons. First, they tend to be very expensive due to the cost of materials required for their construction, and their complex construction makes mass-production difficult. Additionally, electrochromic windows tend to have a lower life expectancy than conventional windows due to degradation of the electrochromic materials used in the windows. The combination of added cost and lower life expectancy has deterred many architects and builders from using electrochromic windows.

Recent advances have resulted in electrochromic windows that cost less and have higher life expectancies. Examples of such electrochromic windows are disclosed in commonly assigned U.S. Pat. No. 6,407,847, entitled "ELECTROCHROMIC WINDOWS AND METHOD OF MANUFACTURING THE SAME." Perhaps because electrochromic windows had not previously been widely accepted commercially, little thought had been given to practical window constructions that enable power to be delivered to an electrochromic window element through conventional types of window frame assemblies. While electrochromic windows have been discussed in the prior art, the typical construction that is disclosed merely shows two or more wires extending from a window frame in which the electrochromic window elements are mounted. Such a construction does not allow for electrochromic window elements to be mounted in a window sash that moves relative to a stationary window frame, nor do such constructions allow for easy construction of such window assemblies or easy replacement of an electrochromic window element. In general, electrochromic window assemblies can be relatively heavy, as may conventional window assemblies. Thus, if the window installers must additionally handle dangling wires from a window assembly when attempting to install the window assembly in a building, an additional person may be required just to manage the wires as the windows are being installed. Further, once the wires are secured to a power source, replacement of the windows is more difficult.

The prior art also fails to address techniques for controlling the transmission of a plurality of such electrochromic windows in a building either independently or in various groupings. Therefore, there exists a need for an electrical control system for controlling the transmittance of a plurality of variable transmission windows in a building.

SUMMARY OF THE INVENTION

Accordingly, it is an aspect of the present invention to provide an electrical control system for controlling a plurality of variable transmittance windows. To achieve these and other aspects and advantages, the electrical control system of the present invention comprises a master control circuit for supplying control signals representing transmittance levels for the variable transmission windows, and a plurality of window control circuits coupled to each of the master control circuits. Each window control circuit controls the transmittance of at least one of the variable transmission windows in response to control signals received from the master control circuit.

Another aspect of the present invention is to provide a building comprising a plurality of variable transmission windows, a master control circuit for supplying control signals representing transmittance levels for the variable transmission windows, and a plurality of window control circuits coupled to the master control circuit. Each window control circuit controls the transmittance of at least one of the variable transmission windows in response to control signals received from the master control circuit.

An additional aspect of the present invention is to provide a window control circuit for controlling at least one variable transmission window in response to signals received from a master control circuit. The window control circuit of the present invention comprises a micro controller coupled to receive the signals from the master control circuit, and a switching regulator circuit for supplying power to the at least one variable transmission window. The switching regulator circuit is coupled to the micro controller and is responsive to signals received from the micro controller to selectively vary the power supplied to the variable transmission window.

Another aspect of the present invention is to provide a master control circuit for supplying control signals to at least one window control circuit that controls the transmittance of at least one variable transmission window in response to the control signals. The master control circuit of the present invention comprises a micro controller for generating signals representing a desired transmittance for the variable transmission window and a power switching circuit for supplying power to the at least one window control circuit. The power switching circuit is coupled to the micro controller and is responsive to signals received from the micro controller to vary the power supplied to the at least one window control circuit.

An additional aspect of the invention is to provide an electrical control system for controlling the transmittance of at least one variable transmission window. The control system of the present invention comprises a control circuit coupled to the variable transmission window for selectively varying the electrical energy applied to the variable transmission window, and a receiver for receiving a command from a remote control device via a wireless communication link. The receiver is coupled to the control circuit to supply a control signal representing the received command. The control circuit responds to the receipt of a control signal by varying the transmittance of the variable transmission window.

Another aspect of the present invention is to provide an electrical control system for controlling the transmittance of at least one variable transmission window. The control system of the present invention comprises a control circuit coupled to the variable transmission window for selectively varying the electrical energy applied to the variable transmission window, a sensing circuit for sensing an abnormal electrical load condition including a near short or near open circuit, in the variable transmission window, and a security system interface coupled to receive an indication from the sensing circuit that an abnormal electrical condition exists in the variable transmission window.

Another aspect of the present invention pertains to a method of determining whether a security breach has occurred through the breakage or opening of a variable transmission window, the variable transmission window providing a current path when closed. The inventive method comprises the steps of sensing whether there is an electrical near short or near open circuit or other abnormal electrical performance indicative of physical damage to the window in the current path through the variable transmission window, and determining that there has been a security breach through the variable transmission window when an electrical near short or near open circuit or other abnormal condition is sensed.

An additional aspect of the present invention is to provide a window having a transmittance that varies in response to an electrical signal where the window comprises a window frame; a sash mounted to the window frame so as to be movable relative to the window frame; a variable transmission window element mounted in the sash; a first electrical coupler mounted to the window frame and electrically coupled to a source of an electrical signal; and a second electrical coupler mounted to the sash and electrically coupled to the variable transmission window element, the second electrical coupler moves relative to the first electrical coupler and contacts the first electrical coupler to thereby enable the electrical signal to be transmitted from the window frame to the variable transmission window element.

Another aspect of the present invention is to provide a window having a transmittance that varies in response to an electrical signal where the window comprises a window frame assembly; a variable transmission window element mounted in the window frame assembly; a first electrical coupler mounted to the window frame assembly and electrically coupled to a source of an electrical signal; and a second electrical coupler mounted to the variable transmission window element. The first electrical coupler includes a resilient contact member biased towards the second electrical coupler.

Yet another aspect of the present invention is to provide a window having a transmittance that varies in response to an electrical signal, where the window comprises: a window frame; a sash mounted to the window frame so as to be movable relative to the window frame; a variable transmission window element mounted in the sash; a first electrical coupler mounted to the window frame and electrically coupled to a source of an electrical signal; a second electrical coupler mounted to the sash and electrically coupled to the variable transmission window element; and a flexible cable coupled between the first and second electrical couplers to thereby enable the electrical signal to be transmitted from the window frame to the variable transmission window element, the flexible cable having a length sufficient to permit movement of the sash between open and closed positions.

Still another aspect of the present invention is to provide a window having a transmittance that varies in response to an electrical signal where the window comprises: a window frame; a variable transmission window element; a first electrical coupler mounted to the window frame and electrically coupled to a source of an electrical signal; and a second electrical coupler electrically coupled to the variable transmission window element. The first and second electrical couplers have contact surfaces that engage one another to thereby enable the electrical signal to be transmitted from the window frame to the variable transmission window element.

Another aspect of the present invention is to provide an electrical control system for controlling the transmittance of a plurality of variable transmittance windows. The control system includes a master control circuit for supplying control signals that are capable of changing the transmission levels of the variable transmission windows and a plurality of window control systems coupled to the master control circuit, each window control circuit controls the transmission level of at least one of the variable transmission windows in response to control signals received from the master control circuit. The control system further includes a light sensor coupled to the master control circuit to input data for use in performing control functions and a temperature sensor coupled to the master control circuit to input data for use in performing control functions.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 5C is an isometric view shown in partial cross section illustrating a non-opening window construction utilizing the electrical connection shown in FIG. 5A;

FIG. 5D is an isometric view of the back of an electronic module that may be attached to the window frame shown in FIG. 5C;

FIG. 5E is an isometric view of the front of the electronic module shown in FIG. 5D;

FIG. 8 is an isometric view in partial cross section showing the electrical connection for a window construction according to a third embodiment of the present invention;

DETAILED DESCRIPTION OF THE PREFERRED EMBODIMENTS

Figure 1:
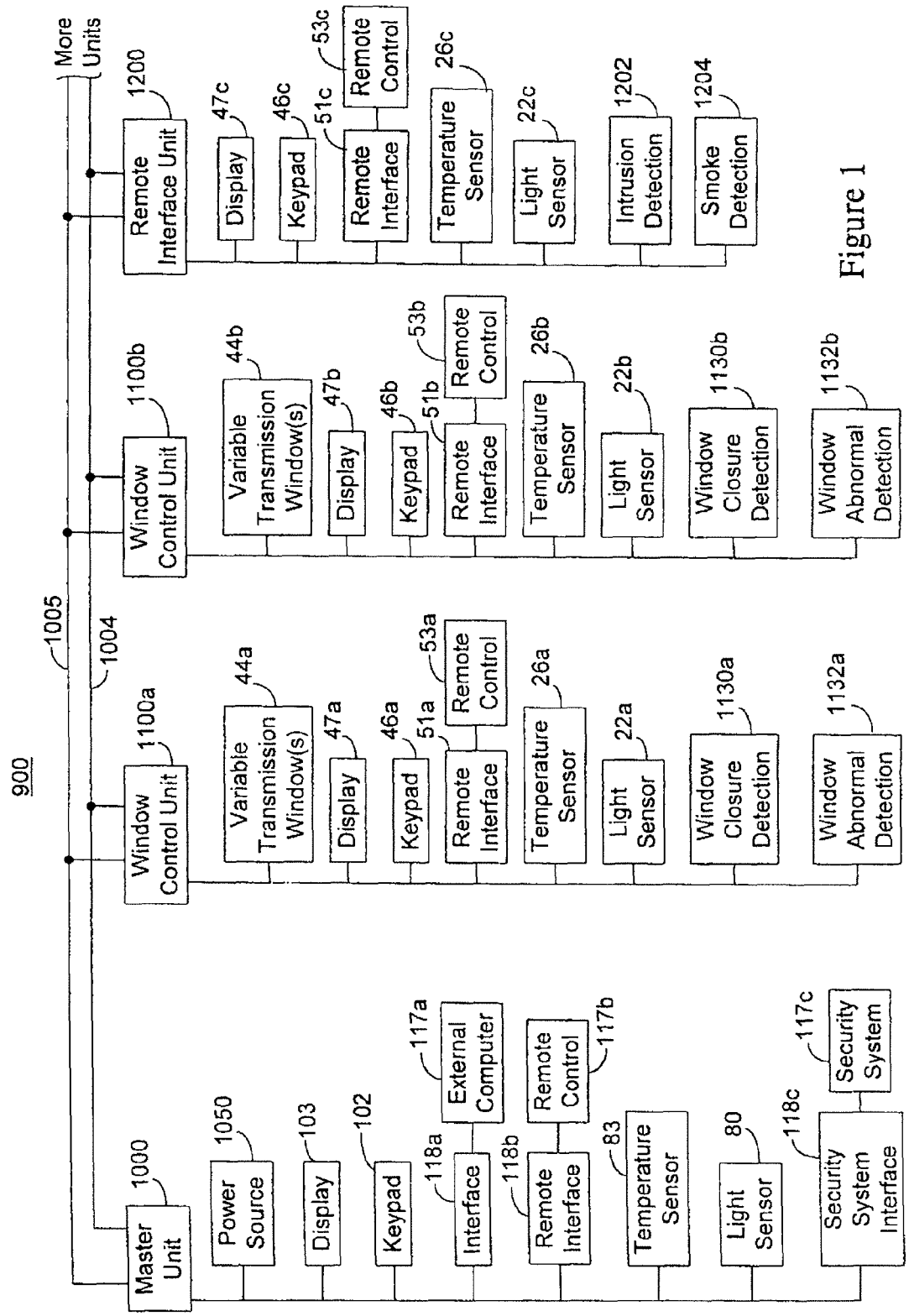
FIG. 1 is a block diagram of the electrical control system of the present invention.

Reference will now be made in detail to the present preferred embodiments of the invention, examples of which are illustrated in the accompanying drawings. Wherever possible, the same reference numerals will be used throughout the drawings to refer to the same or like parts.

For purposes of description herein, the terms "upper," "lower," "right," "left," "rear," "front," "vertical," "horizontal," "top," "bottom," and derivatives thereof shall relate to the invention as shown in the drawings. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

The present invention pertains to a novel electrical control system for controlling the transmission of a plurality of variable transmission windows and also pertains to various window constructions and various constructions of electrical connectors in those window constructions that make it practical to employ the electrical control system of the present invention. Other inventive aspects flowing from the combined electrical and mechanical structures described herein will become apparent to those skilled in the art and include, among other aspects, a method for determining whether a security breach has occurred through the breakage or opening of a variable transmission window.

FIG. 1 shows a block diagram of the electrical system 900 of the present invention, which interconnects, links, and controls variable transmission windows 44a-44b. A master unit 1000 (also referred to herein as a "master control circuit") is connected to a power source 1050, which is preferably attached to the AC power line. Master unit 1000 is also coupled to one or more devices to receive and/or display information. These devices may include one or more in combination of a display 103, a keypad 102, an interface 118a to an external computer 117a, and/or a remote control interface 118b and an associated portable remote control input and/or output device 117b. Master unit 1000 may also optionally be coupled to an interface 118c to a security and/or fire or smoke detection system 117c, and in some cases may incorporate these features directly. Master unit 1000 may also be coupled to temperature 83 and/or light sensors 80 to input data for use in performing control functions.

Power source 1050 may include a battery backup and is preferably, but not necessarily, incorporated directly as part of master unit 1000. If power source 1050 is equipped with battery backup and particularly if fire alarm and/or security functions are included, it is preferred to communicate via an input to the micro controller 81 (FIG. 2A) in master unit 1000 that power source 1050 is in battery backup mode and to curtail certain energy consuming dimming functions and the like, which will significantly extend battery life and not interfere with the critical safety functions.

In larger systems, master unit 1000 may support more than one communication and energy supply path. In the simplest case, the circuit of FIGS. 2A and 2B, which supplies power to, and interfaces with, lines 1004 and 1005, may be replicated and micro controller software support may be added for the multiple controller interface buses. More than one master unit may also be linked in a system either by providing an interface to link directly with another master unit or by interfacing multiple units to another external computer or control system.

Master unit 1000 communicates with window control units 1100a-1100b (also referred to herein as "window control circuits") that are provided for individual variable transmission windows or clusters of windows 44a-44b. Window control units 1100a-1100b may include window closure detection functions 1130a-1130b for use in associated or integrated security systems 117c. Window control units 1100a-1100b may also include abnormal window detection functions 1132a-1132b by which they monitor things such as supply current to window 44a-44b under specific drive conditions to detect abnormal response of the window. Abnormal responses, such as a near short or near open, would likely result from window breakage due to forced entry and as such provide a useful input to a security system 117c. In a number of embodiments, contact to variable transmission window 44a-44b is broken when the window is open. In these cases, a complete open circuit to the variable transmission window indicates that it is open. This may also be used for security purposes. Master unit 1000 may also communicate with separate devices 1200 provided for displaying information to, and inputting control commands from, users and/or intrusion and/or smoke and fire detection functions. Optionally, features of the devices above may be combined or separated and regrouped in almost any combination as interface 51a-51c and/or window control units. Any of the units may input other data used to control the system such as temperatures or light levels, and any of the units may include a remote control interface and associated portable remote control input or two-way input/output device 53a-53c. Any of the units may also have their own display 47a-47c and/or input device such as a touch panel or keypad 46a-46c. The communication between units may take any one of a number of forms including those incorporating ethernet links or data links in general purpose control and data transmission systems for homes or commercial buildings. Furthermore, these links may include RF or optical paths which may either be through air or via fiber. A preferred configuration incorporates a particularly inexpensive two-wire interconnect arrangement or interface bus by which master unit 1000 energizes and communicates with all or a group of the window control unit(s) 1100a-1100b and remote interface unit(s) 1200 over a single pair of wires 1004 and 1005 of low voltage wires. The operating voltage over wires 1004 and 1005 is preferably toward the higher end of that which is permissible and safe for a low voltage system so that appreciable power at an acceptable current may be supplied to a large number of units with a minimal number of separate interface buses in a large installation.

The system described bears some general resemblance to two-wire smoke detector systems used in some commercial installations, but has many novel features which in addition to the very different application or the new shared application, distinguish it from these systems.

Figure 2A:
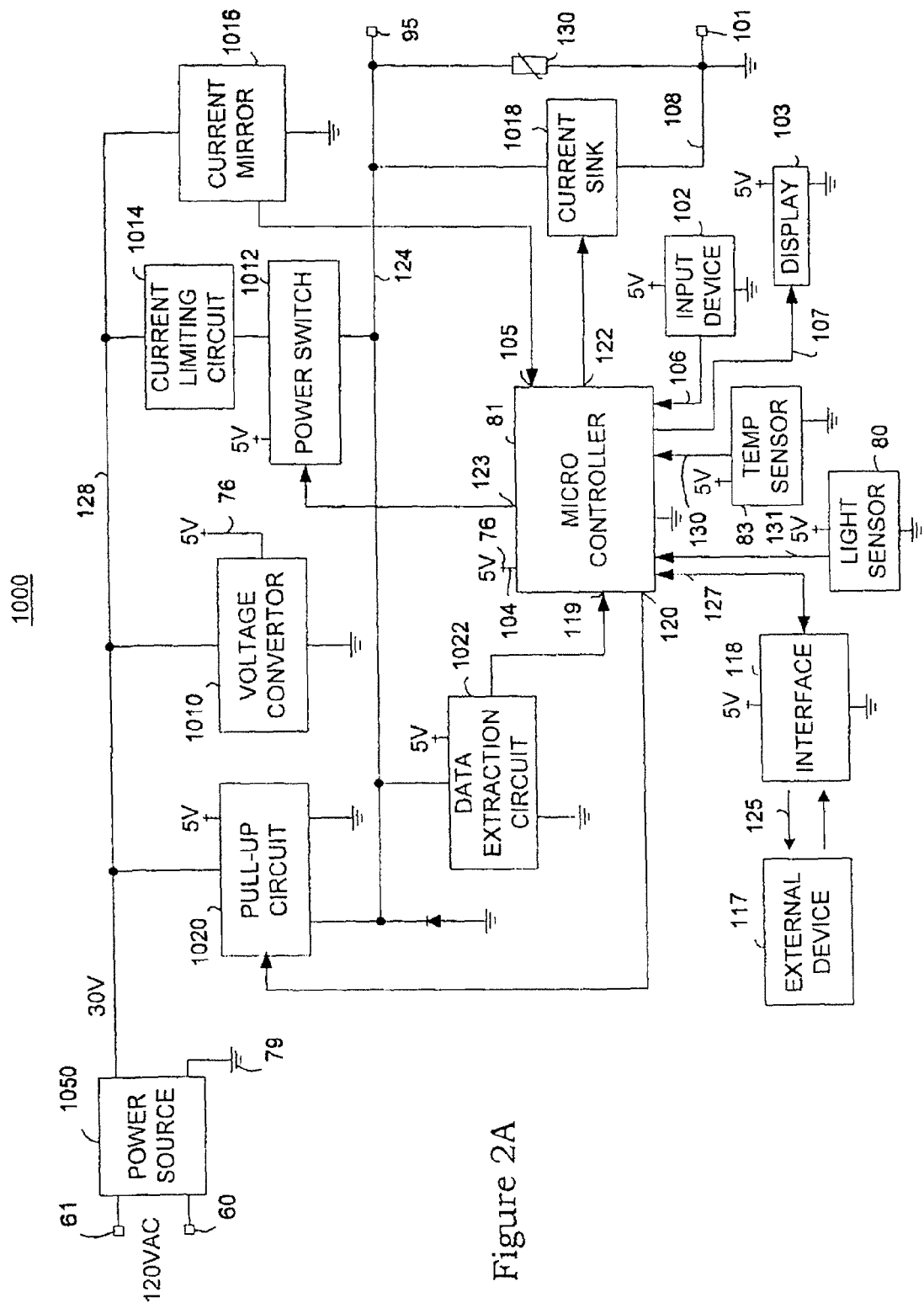
FIG. 2A is a block diagram of a master control unit used in the electrical control system shown in FIG. 1.

FIG. 2A depicts a combined circuit and block diagram of a preferred design for master unit 1000 of FIG. 1. As shown in FIG. 2A, master unit 1000 includes a power source 1050 having two or more terminals 60 and 61 for connection to a 120 VAC commercial power line. As explained further below, power source 1050 provides a common ground 79 and a 30 volt output on line 128. Master unit 1000 also includes a voltage converter 1010 that is coupled to line 128 to convert the 30 volt power on line 128 to a 5 volt output that is supplied to the various circuit components of master unit 1000. Master unit 1000 further includes a micro controller 81, a power switch circuit 1012, a current limiting circuit 1014, a current mirror circuit 1016, a current sink circuit 1018, a pull-up circuit 1020, and a data extraction circuit 1022. The detailed operation and construction of these components are described further below with reference to FIG. 2B.

Figure 2B:
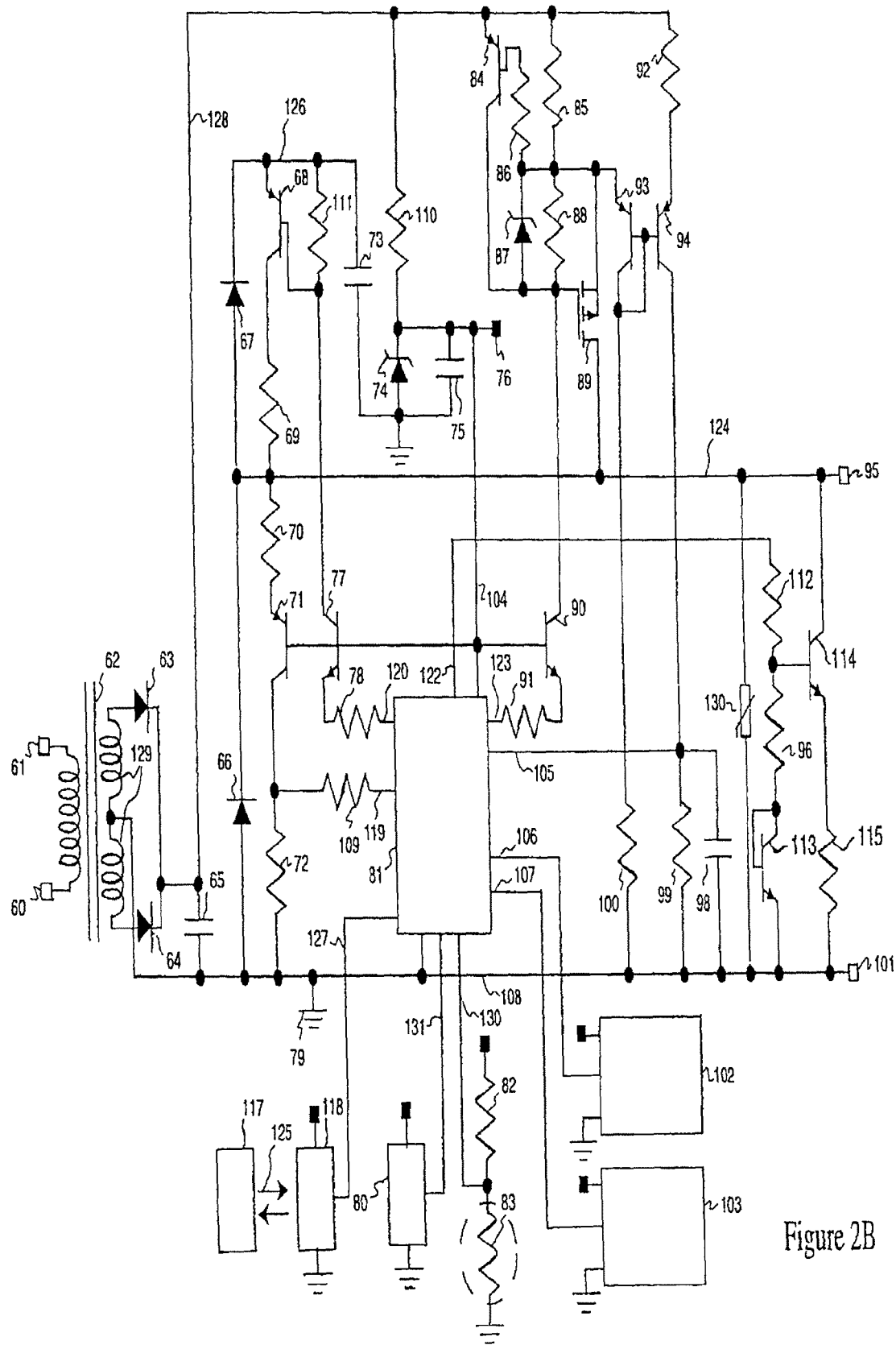
FIG. 2B is an electrical circuit diagram in block and schematic form showing the details of an exemplary master control unit that may be used to implement the master control unit shown in FIG. 2A.

As shown in FIG. 2B, power source 1050 includes a transformer 62 having center-tapped secondary coils 129, rectifier diodes 63 and 64, and a capacitor 65. Transformer 62 receives power to its primary from the AC line via terminals 60 and 61. The isolated, center-tapped secondary 129 supplies a DC voltage of, for example, 30 volts to line 128 through rectifier diodes 63 and 64. Capacitor 65 filters this supply and limits transient voltages. Additional surge protection, not shown, is desirable and may be included.

Voltage converter 1106 may include a current limiting resistor 110, a voltage-clamping Zener diode 74, and a filter capacitor 75. Current from supply line 128 flows through current limiting resistor 110 to voltage-clamping Zener diode 74 and filter capacitor 75 to supply micro controller 81 with a supply voltage of, for example, 5 volts on line 104. Standard circuits, such as resonators or power-on reset circuit connections, which differ widely from one micro controller to another but which are fully described in application circuits for each, are not shown here or in the circuit of FIGS. 2B and 3B.

Each micro controller 81 (and 14, FIGS. 3A and 3B) in the system is provided with either an integrated or separate re-writeable memory which will not lose stored data when power is lost. Common types now include flash memories and EE (electronically erasable) memories. These memories, especially in the slave window control units, do not need to be large but among other things are required to store unit addresses and other configuration and preference data. The black square terminal 76 connected to micro controller power supply line 104 is connected to the other similar appearing terminals in the circuit. Likewise, the ground symbols are all interconnected with ground terminal 79 which is connected to terminal 101.

Power switching circuit 1012 may include a limiting resistor 91 coupled to an output 123 of micro controller 81, a level shifting transistor 90, a p-channel FET 89, a resistor 88, and a Zener diode 87. Output 123 of micro controller 81 is switched low at a rate and duty cycle of, for example, 1 kHz and 50 percent. When output 123 is pulled low, current through limiting resistor 91 and level shifting transistor 90 pulls the gate of p-channel FET 89 low turning it on. This in turn pulls line 124 close to the positive supply potential on line 128 and supplies a charging pulse to the internal circuit components through a diode 67 and to external units connected in parallel to terminal 95. The balance between the gate capacitance of FET 89 and the resistance of resistor 91 limits the rate of rise of the turn-on voltage and the resulting slew rate of turn on of FET 89 to limit radiated interference. When output 123 is switched high, current is no longer drawn through transistor 90, and resistor 88 discharges the gate capacitor of FET 89 at a limited rate to limit the turnoff rate of FET 89. Zener diode 87 limits gate voltage to FET 89 to a safe level.

Current limiting circuit 1014 includes a current sensing resistor 85, a transistor 84, and a resistor 86. The voltage on current sensing resistor 85 turns on transistor 84 when the current is excessive to turn off FET 89 and limit short circuit current.

Current mirror 1016 includes transistors 93 and 94; resistors 92, 99, and 100; and a filter capacitor 98. Current mirror 1016 creates a filtered voltage at an input port 105 of micro controller 81, which is level shifted from, and tracks, preferably at an amplified level, the voltage on current sensing resistor 85. Port 105 is an analog port to micro controller 81. Micro controller 81 samples the voltage on port 105, which is indicative of the current supplied to the connected units for a number of purposes, two of which are: first, when the sensed current is very high indicating a short, turn on of FET 89 is inhibited so that the analog current limiting components are not overloaded. At high currents that are still in a normal operating range, micro controller 81 may be programmed to delay or reduce darkening of some of windows 44a and 44b to lower the peak current requirement thereby performing a form of load demand leveling.

As described above, the supply current is supplied in pulses. These pulses serve as a time base for communication which takes place during the off periods in the pulsed supply. There are three components used by master unit 1000 to communicate with other units on lines 1004 and 1005. First, a current sink 1018 composed of transistors 113 and 114 and resistors 112, 96, and 115 is turned on to pull line 124 and the terminals of other units connected to output terminal 95 low during the off periods of the supply cycle. Master unit 1000 and each of the connected units 1110a, 1110b, and 1200 has a pull-up circuit 1020 and 1108, respectively, to supply enough current from the positive supply to override current sink 1018 and pull line 124 high for the communication arrangement which will be described below. Output 122 of micro controller 81 is switched high to turn on current sink 1018.

Pull-up circuit 1020 may include a current limiting resistor 78, a level shifting transistor 77, a current limiting resistor 69, a transistor 68, a diode 67, a filter capacitor 73, and a resistor 111. To pull line 124 high, micro controller 81 switches output 120 low, which is coupled to pull-up circuit 1020, thereby drawing current through current limiting resistor 78 and level shifting transistor 77 turning on transistor 68 thereby pulling line 124 and associated output terminal 95 high through current limiting resistor 69. Diode 67 charges filter capacitor 73 during the half cycle charging cycle to provide the positive supply at line 126 for pull-up circuit 1020.

Data extraction circuit 1022 may include resistors 72 and 109, a transistor 71, and a current limiting resistor 70. When the voltage on line 124 significantly exceeds the micro controller supply voltage on line 104, current through current limiting resistor 70 turns on transistor 71 pulling input terminal 119 of micro controller 81 high. Micro controller 81 samples the voltage at terminal 119 to detect the logic level on line 124. Resistor 109 limits input current at input terminal 119 and resistor 72 pulls the input low when line 124 is at the logic low level.

Master unit 1000 may further include a MOV 130 and a diode 66. MOV 130 limits transient voltages on line 124. For units designed for a large number of interconnecting devices, an alternative voltage overprotection device, which has lower capacitance, may be preferred. Diode 66 limits reverse voltage transients on line 124.

Input device 102, preferably a small keypad, is connected to micro controller 81 by lines in a bus 106 and similarly, display 103, which is preferably an LCD or vacuum fluorescent display, is connected to micro controller 81 through a bus 107. A thermistor 83 forms a voltage divider with a series resistor 82 such that the temperature dependent voltage may be read at an analog input 130 of micro controller 81. Light sensor 80 is preferably an active pixel type described in commonly assigned U.S. Pat. No. 6,313,457, entitled "MOISTURE DETECTING SYSTEM USING SEMICONDUCTOR LIGHT SENSOR WITH INTEGRAL CHARGE COLLECTION," filed on Apr. 13, 1999, and is controlled and read through a bi-directional port 131 of micro controller 81. The entire disclosure of U.S. Pat. No. 6,313,457 is incorporated herein by reference.

Interface unit 118 is any of a number of optional interface units as described above connected to micro controller 81 by a bus 127. External unit 117 communicates with interface unit 118 over path 125, which is optionally and preferably bi-directional. Additional components similar to 117 and 118 may be added to interface to a multiplicity of external systems 117a and 117b and security and/or fire detection systems 117c may be the target system 117 for versions incorporating an interface either to single or to multiple external systems.

Figure 3A:
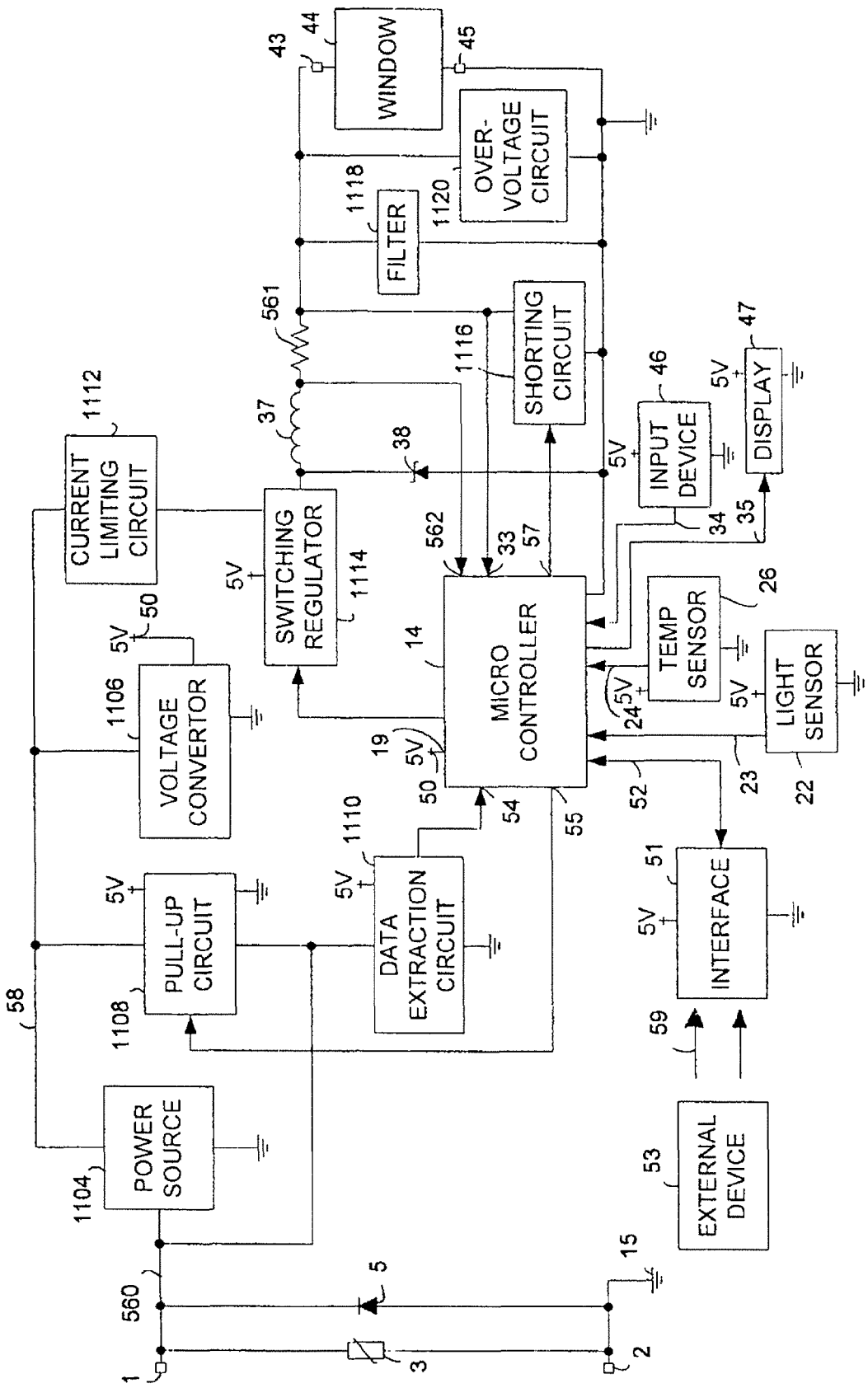
FIG. 3A is a block diagram of a window control unit used in the electrical control system shown in FIG. 1.
Figure 3B:
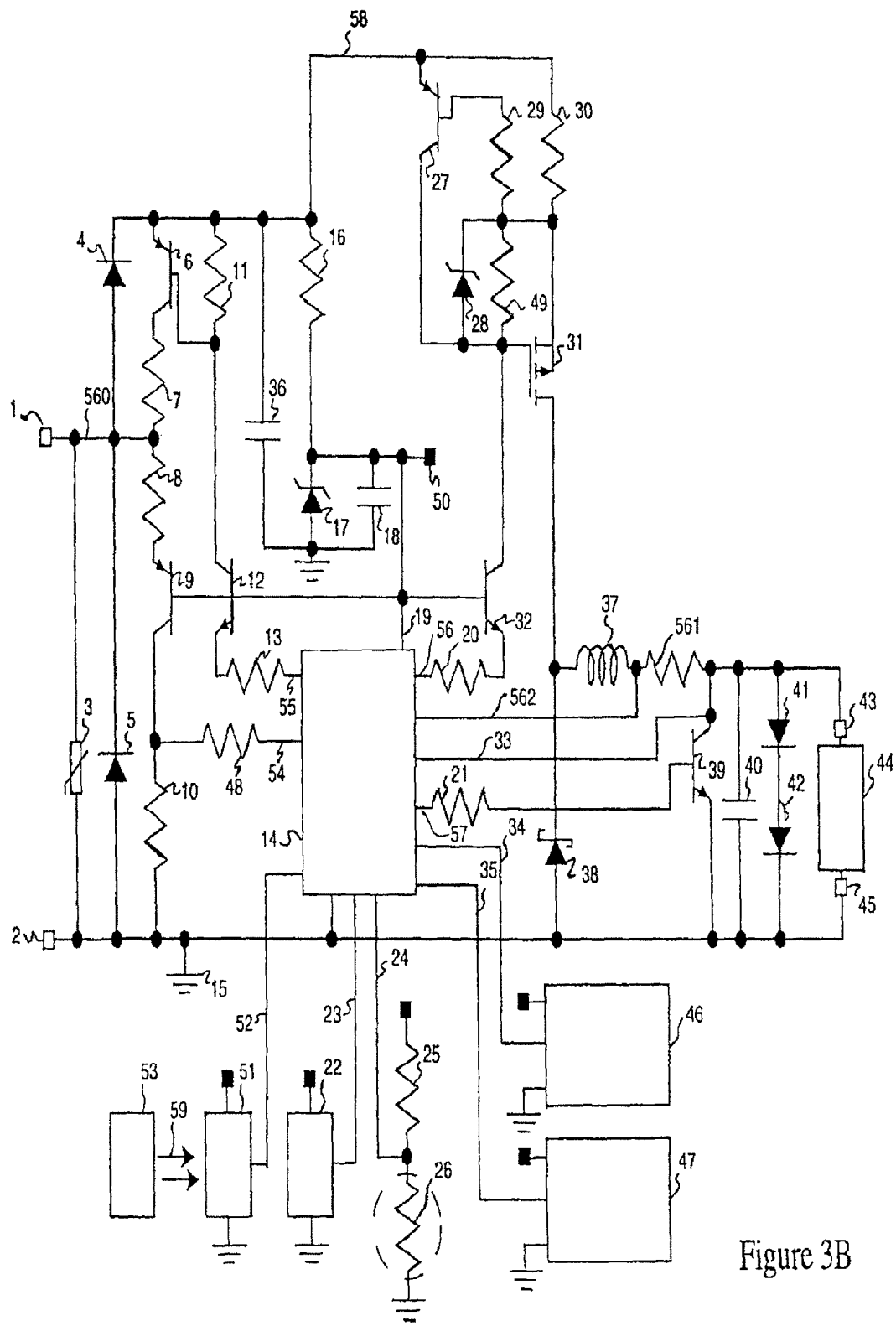
FIG. 3B is an electrical circuit diagram in block and schematic form illustrating an exemplary detailed construction of a window control unit that may be used to implement the window control unit shown in FIG. 3A.

FIGS. 3A and 3B are combined schematic and block diagrams of a preferred circuit design for the slave units depicted in blocks 1100a, 1100b, and 1200 of FIG. 1. As shown in FIG. 3A, window control unit 1100 includes a micro controller 14, a power source 1104 for supplying power on line 58, a voltage converter 1106 for supplying 5 volt power for the various circuit components, a pull-up circuit 1108, a data extraction circuit 1110, a current limiting circuit 1112, a switching regulator circuit 1114, a shorting circuit 1116, a filter 1118, an over-voltage protection circuit 1120, and a pair of terminals 43 and 45 for coupling to one or more variable transmission window elements 44. Unit 1100 may further include an inductor 37, a current monitoring resistor 561, and a Schottky barrier diode 38. The detailed functions of these components and exemplary circuit constructions are shown and described with respect to FIG. 3B below. Remote interface unit 1200 would have a similar construction to window control units 1100, but need not have the components for controlling the transmittance of a window. Remote interface unit 1200 may also be configured to perform intrusion detection functions 1202 and smoke detection functions 1204.

Circuits for the various optional functions may be added, replicated, or omitted depending on whether the particular function is present, duplicated, or not present in the particular unit. The function of micro controller 14 is quite different from that of master unit 1000 of FIG. 1, but the circuit configuration is very similar and a micro controller 14, which is similar but perhaps smaller in size than the micro controller 81 of FIGS. 2A and 2B, is preferably used.

The unit receives pulsed power on terminal 1, which for multiple units is connected in parallel to the corresponding terminals of the similar units and to terminal 95 of master unit 1000 in FIG. 2A. A ground terminal 2 is connected to the corresponding ground terminals of similar parallel connected units and to ground terminal 101 of master unit 1000 in FIG. 2A. These two parallel interconnecting lines correspond to lines 1004 and 1005 of FIG. 1.

Each unit may also include a MOV 3 and a diode 5 coupled across terminals 1 and 2. MOV 3 serves the same function as MOV 130 in FIG. 2B and the same preference for an alternative lower capacitance device for applications where a large number of devices are to be connected in parallel applies.

Power source 1104 includes a diode 4 and a filter capacitor 36. The pulsed power from terminal 95 of the master unit in FIG. 2A flows through diode 4 and charges filter capacitor 36 to provide supply voltage 58.

Pull-up circuit 1108 includes resistors 7, 11, and 13 and transistors 6 and 12, and is responsive to a signaling output supplied by micro controller 14 at output terminal 55. Transistor 6 is turned on to pull line 560 and terminal 1 high to communicate back to the master unit in the signaling scheme to be described in connection with FIG. 4. Data extraction circuit 1110 may include resistors 8, 10, and 48 and a transistor 9. Data extraction circuit 1110 is coupled to line 560 and extracts data signals received at terminal 1 and supplies the data to micro controller 14 at input terminal 54. The signaling output at terminal 55 of micro controller 14 and the signaling input at terminal 54 and the function of the associated level shifting circuits are similar to the nearly identical functions in FIG. 2B so a description will not be repeated. Likewise, the optional input device 46, the optional display 47, thermistor 26, and light sensor 22 are similar to corresponding circuits in FIGS. 2A and 2B.

Current monitoring resistor 561 is in series with the window supply, which is provided by switching regulator circuit 1114 and window 44. A break in window 44 is very likely to cause a partial short or partial open or other abnormal loading condition indicative of damage to window 44, in the electrical circuit and in either case causes an abnormal current level for a given drive condition.

Input terminal 33 of micro controller 14, as described elsewhere, receives an analog input by which micro controller 14 measures the voltage supplied to window 44. Input 562 is a similar analog input. The two inputs in combination enable micro controller 14 to measure voltage on each side of resistor 561 and to take the difference to determine the resulting voltage drop across resistor 561 and to thereby calculate the current supplied to window 44. Measurements of the voltages at inputs 33 and 562 are preferably taken in very quick succession and at a known time in the pulsing cycle of the switching power supply to obtain consistent readings. As another alternative or as an additional measurement, the voltage decay rate of window 44 when it is open circuited may be measured and compared with a recent result to determine a sudden change due to breakage of window 44.

During maintenance of the window element in a steady, reduced transmission mode, the control module measures and records the readings of supply current to the variable transmission window elements and compares them against corresponding recently recorded readings to detect abrupt, abnormally large changes in supply current which nearly always indicate window breakage or loss of connection. The window control unit may apply short interruptions of predetermined duration in the supply current to the variable transmission element. The voltage decay characteristic due to the interruptions in the supply current may also be measured, recorded and compared against values obtained from like measurements which were recently recorded. Again, abrupt, abnormally large changes normally indicate window breakage or loss of connection.

When the window is clear, the control module periodically supplies a voltage pulse of known amplitude and duration to the variable transmission element and monitors and records the amplitude and waveform of the responding supply current to the variable transmission element. Normally a current amplitude and decay characteristic such as decay time constant are recorded. The voltage amplitude and voltage decay waveform of the variable transmission element after termination of the pulse may also be recorded. The response measurements are compared with corresponding recent response measurements to detect abrupt, abnormally large changes in the corresponding response readings which normally indicate window breakage or loss of connection.

When monitoring for security is enabled, the master unit normally polls each of the window control units to signal changes which indicate a probable breach of security. The abnormal conditions noted above are signaled or reported in response to the query from the master unit after such conditions are detected.

In a startup sequence after the system is installed or after units are added or replaced, individual slave units 1100/1200 must be identified so that addresses may be assigned by master unit 1000. The preferred sequence to do this is to place master unit 1000 in a special startup address assignment mode. Master unit 1000 may in sequence broadcast the next new address and then issue a query instruction to see if a slave has accepted this address and responded. In order to limit more than one slave unit 1100/1200 from accepting the same address and also to aid in establishing an identity between addresses and specific units, it is preferred that, while in the address assignment mode, the installer actuate or optionally toggle an input device 46 for each unit for which an address is to be assigned one at a time in sequence and that only the slave unit for which the input is actuated or toggled may accept the address. When a display 47 is provided, it is preferable to have display 47 respond to verify that the address assignment has been made and that the unit is functioning. Individually exercising inputs 46 of the unit to receive the next address assignment prevents contention over having multiple units accept the same address and collide on the bus in trying to answer back at the same time and, as noted before, provides a framework in which specific addresses may be correlated with specific units. As will be noted later, it is often preferable to have the window control module hidden by recessing it in the window sash and a separate module for the user interface for the control is often preferable. In such cases, the window control module may not require or have an input device 46 for normal user interface. Since an input is required or at least preferred for address assignment, input device 46 may, in this case, be a magnetically actuated reed switch or hall effect sensor or other magnetic field strength sensor which may be actuated by bringing a magnet in close proximity to the window control module. For modules which do not have a sophisticated display, it is preferred to have at least one or two indicator LEDs to, for example, serve as display 47 and indicate status in address assignment or troubleshooting procedures and to indicate working status during normal operation. In windows which open, the same reed switch or other field strength sensor may be actuated by a magnet in an adjoining window sash or latch mechanism in such a way that the switch is actuated only when the window is properly closed. Note that this function is similar to that supplied by separate wires, magnets and reed switches in security systems common today; but, in this case, everything except the embedded permanent magnet is already part of the window control system. The window closure status may be relayed to security system 117c or, in some cases, the security and even fire detection functions may be incorporated as part of the window control system. Note that there are many reasons to identify each module in the system. Two of the reasons follow: first, a control input module must be associated with the window controller of the window being controlled. Second, in more elaborate systems, status or alarm displays may indicate the status information on various specific units in the system either in text or graphic form requiring knowledge of unit location.

In a typical application, each remote control 53 may be used by the occupant of an individual office to control or to override the automatic control of the window dimming in his or her office. For such applications, there is not a great need for interface 51 to be capable of sending information to remote unit 53 and the individual remote controls 53 for each office may be for input of commands to the system only. For such an application, it is also preferable to use infrared-based controls which are inexpensive and very good for short range. Furthermore, infrared signals will not travel through a wall to interfere with a similar unit in an adjoining office. In many applications of such systems, the receiver and controller do not need to be keyed together since the rooms in which they are used provide adequate separation. Having remote unit 53 work with receiver 51 in different locations may be beneficial. In the circuit of FIGS. 3A and 3B, interface 51 receives infrared signals 59 from remote unit 53 and communicates with micro controller 14 over a bus 52.

Voltage converter 1106 may include a Zener diode 17, a capacitor 18, and a resistor 16. Current limiting circuit 1112 may include a transistor 27 and resistors 29 and 30. Switching regulator 1114 may include a resistor 20 coupled to an output port 56 of micro controller 14, a resistor 49, a transistor 32, a Zener diode 28, an inductor 37, a diode 38, and a p-channel FET 31. P-channel FET 31 is interfaced in a way which is almost identical to that for FET 89, which is part of the pulsed power supply switch 1012 shown in FIG. 2B. However, FET 31 has a very different application and serves as part of switching regulator 1112 to provide a variable voltage supply to window element or elements 44.

Unit 1100 preferably includes an over-voltage protection circuit 1120 coupled between the window power supply line and ground line 15. An exemplary over-voltage protection circuit is shown in FIG. 3B as including diodes 41 and 42 coupled in series. Series diodes 41 and 42 conduct to protect the variable transmission window 44 from serious over voltage in the event of a circuit malfunction. Unit 1100 may also include a capacitor 40, which is relatively low in value and serves as a filter 1118 to filter the output of switching regulator 1114.

Micro controller 14 pulls output terminal 56 low to turn on FET 31 and the values of resistors 20 and 49 are chosen as in the similar circuit in FIG. 2B to limit turn on and turn off times of switching regulator 1114 to achieve the desired balance between excessive switching losses and excessive radiated interference. The micro controller program is designed to provide a controlled, variable, and relatively short on time duty cycle for output transistor 31. The output voltage is normally in the range of about 1 volt which is approximately one-thirtieth of the nominal supply voltage at line 58 and the output voltage to the window is approximately equal to the supply voltage multiplied by the duty cycle of the signal output at terminal 56. The voltage applied to the window is frequently measured at analog input terminal 33 of micro controller 14. When the voltage is higher than desired, the on time duty cycle of FET 31 is reduced and when the voltage is lower than desired, the on time duty cycle is increased by micro controller 14. When it is desired to clear window 44, micro controller 14 switches output terminal 56 high to turn off FET 31 and switches output terminal 57 high to turn on a shorting transistor 39 which speeds clearing of the window. Shorting transistor 39 and a resistor 21 together form shorting circuit 1116. Inductor 37 tends to maintain a steady supply current to the window 44 during the switching cycle and Schottky barrier diode 38 carries current when FET 31 is in the off portion of the cycle.

Micro controller 14 and/or micro controller 81 may be programmed to protect the window elements from segregation problems that result when the window elements are otherwise left in their low transmission states for an extended period of time. More specifically, the micro controllers may be programmed to bring the associated window elements to their high transmission states for a predetermined period of time (i.e., one to two hours) at specified times (i.e., at night) so as to ensure that the windows are not continuously left in their low transmission states for extended periods of time.

Many alternative signaling protocols may be used, but the one chosen for the preferred embodiment provides multiplexing of power transmission and signaling for a number of window control units 1100 and remote interface units 1200 on one pair of low voltage wires 1004 and 1005 and provides for electrical interfaces to the modules which are of minimal cost. In the preferred arrangement, master unit 1000 is always the master and the other units are always slaves, but in alternate arrangements still in the scope of this invention, this is not mandatory. Master unit 1000 initiates all transmission and polls slave units 1100/1200 to receive data inputs. When an input sequence from a remote user interface unit 1200 is in progress, master unit 1000 increases the polling rate so that the overall response rate of the system is acceptable. All data unit transmissions are 9 bits long with a "1" start bit always beginning the transmission and with 8 data bits which immediately follow the start bit. A tenth odd parity bit may optionally be added. Master unit 1000 always precedes a transmission with an idle period of at least 9 bits and once started, the transmission is uninterrupted with every bit period used so that there will be a "1" at least every 9th bit during the transmission sequence. In this way, the start of a transmission sequence is always discernable by looking for the first "1" bit after at least 9 consecutive zero bits which signify an idle period. Such a bit is the start bit for the next transmission. Master unit 1000 starts the transmission sequence with transmission of the address of the slave unit which is to respond or in a few cases with a general group broadcast address to which some or all of the units respond. The second transmission in the sequence is always an instruction and, where required, this is followed by one or more words of data written by master unit 1000 and received by the addressed slave unit for a write instruction or one or more data words transmitted by the addressed slave unit to master unit 1000 as a result of a read instruction from master unit 1000.

Figure 4A:
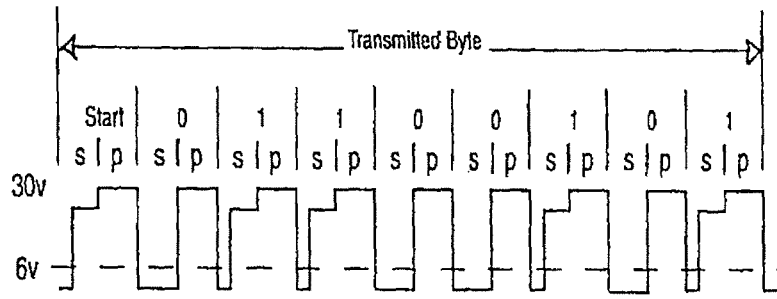
FIG. 4A shows an exemplary signal wave form as would be transmitted between a master control unit and the window control units of the electrical system shown in FIG. 1.

A typical signal waveform which would appear between lines 1004 and 1005 of FIG. 1 for transmission of binary "01100101" is depicted in FIG. 4A. The highest signal voltages (nominally 30V) occur during the half wave power supply pulse output portions of the cycle labeled with a "p." These power output pulses serve to establish the timing for the data transmission, one bit being transmitted between each power pulse in the signaling half cycles labeled with an "s." During the signaling portions of the waveform, master unit 1000 pulls the line low with a current sink. To send a "0," master unit 1000 or a responding slave unit takes no action during the bit period, and to send a "1," master unit 1000 or a responding slave unit waits until it detects a logic low after the power pulse and pulls the line high during the remainder of the bit period into the start of the next power pulse. Thus, the falling edges of the power pulses are left intact for timing purposes. As a practical matter, each unit should wait a short time after detecting the falling edge of the power pulse before pulling the line high so as to allow the pulse to remain low for approximately one-third of the signaling portion of the waveform period (i.e., about one-sixth of the total bit period) so that other units on the line have time to detect the negative edge of the power pulse. In the example circuit with appropriate choice of resistance values, the logic threshold between the "0" and "1" states of the two wire transmission line may be about 6 volts. A "1" bit transmission labeled with "Start" is always sent immediately before the transmission of each packet of eight data bits so that the start of the transmission sequence is unambiguous and so that there will be a "1" at least every ninth bit during a data transmission.

Figure 4B:
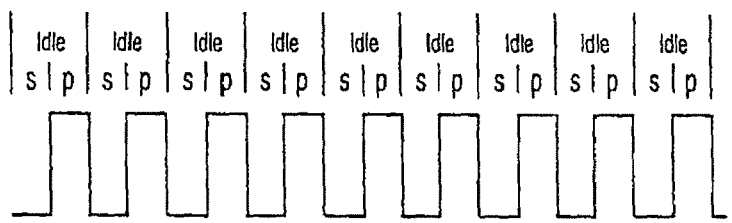
FIG. 4B shows an exemplary idle wave form as would be transmitted between a master control unit and the window control units of the electrical circuit shown in FIG. 1.
Figure 4C:
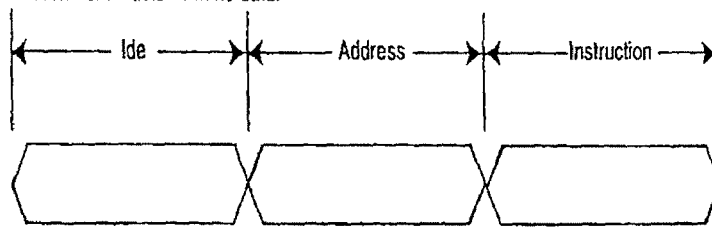
FIG. 4C shows the components of an instruction signal sent from a master control unit to the window control units with no data.
Figure 4D:
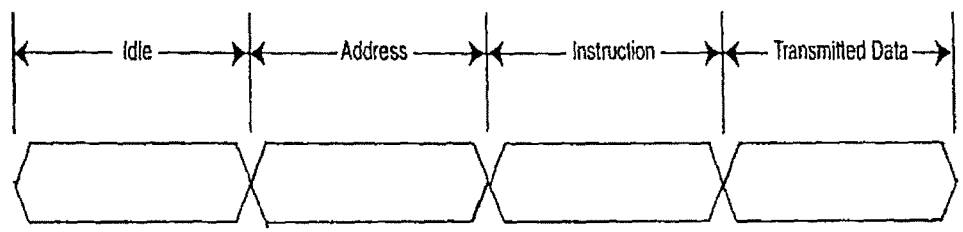
FIG. 4D shows the components of an instruction signal sent from a master control unit to the window control units with data write.
Figure 4E:
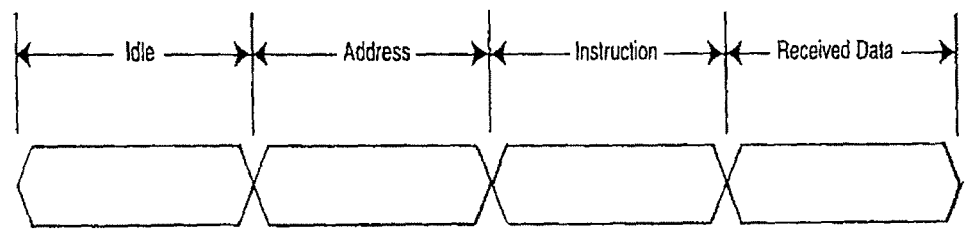
FIG. 4E shows the components of an instruction signal from a master unit to the window control units with data read.

The "Idle waveform:" is shown in FIG. 4B and may have more than, but not less than, nine consecutive "0" bits and must be the first part of any transmission sequence initiated by master unit 1000. Once the transmission is started, no bit gaps are allowed since these could result in more than eight consecutive "0" bits which would confuse slaves listening for their address or a broadcast address on the line. Examples of the byte order for "An instruction from the master with no data:," "An instruction from the master with data write:," and "An instruction from the master data read:" are shown in FIGS. 4C, 4D, and 4E, respectively. Instructions where data is read or written may contain multiple data bytes as long as no gaps occur in the transmission and as long as they conform to a requirement on the maximum time that the bus may be tied up with any one transmission.

Figures 5A, 5B:
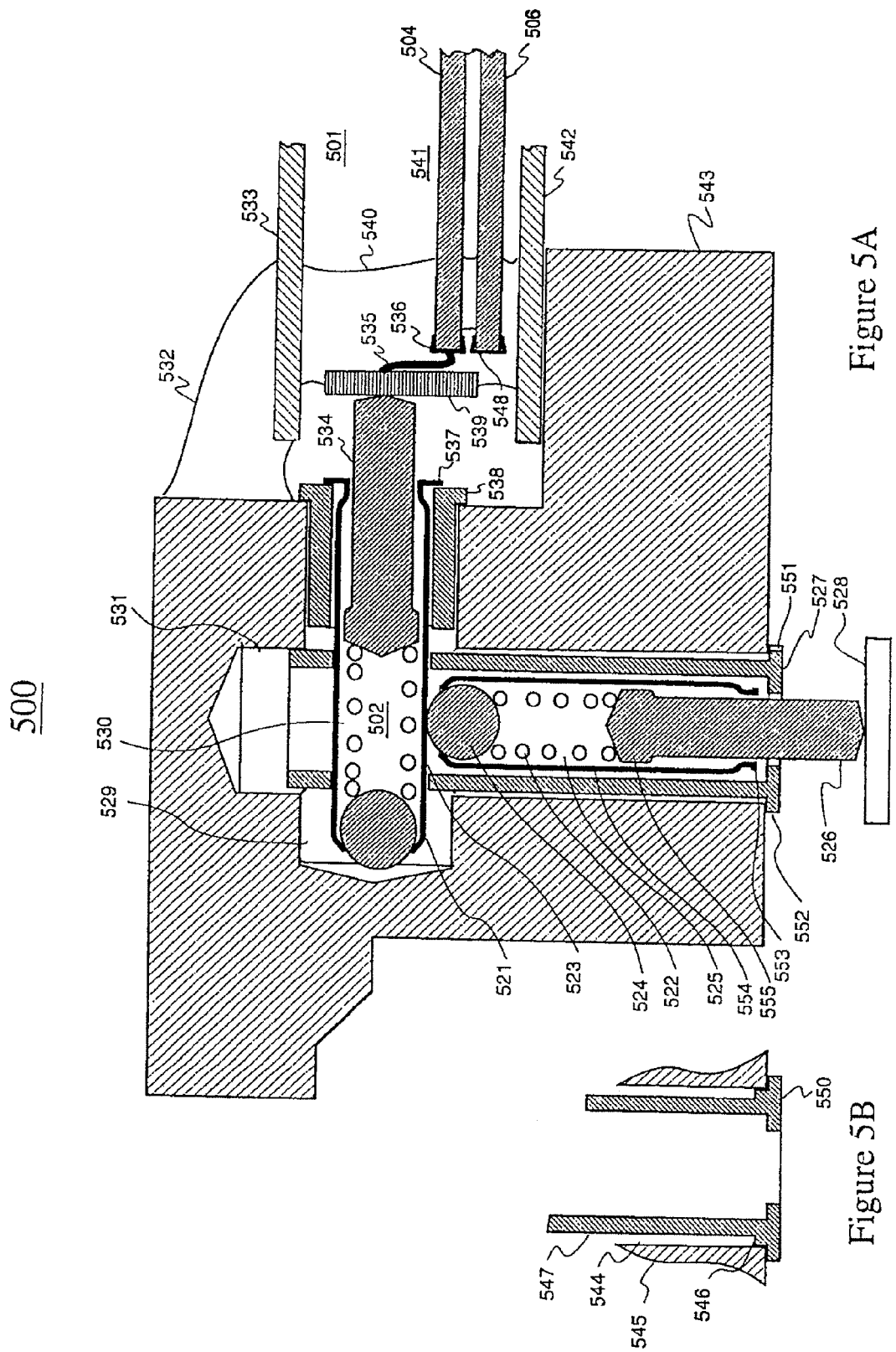
FIG. 5A is a cross-sectional view of an electrical connector utilized in a window construction according to a first embodiment of the present invention.
FIG. 5B is a partial cross-sectional view of a modified portion of the construction shown in FIG. 5A.

Terminals 43 and 45 of the circuit shown in FIG. 3A must each be connected to variable transmission window 44. FIG. 5A shows a cross-sectional view of the details of a contact assembly 502 of a window assembly 500 for making one of these two connections. For purposes of illustration, the connection of terminal 43 is described below. It should be appreciated that the connection of terminal 45 would be the same or similar to that of terminal 43.

As shown in FIG. 5A, window assembly 500 includes a sash 543 in which a window unit 501 is mounted optionally, being removable for replacement. Window unit 501 may be sealed and secured within sash 543 using glazing 532 in a manner well known in the art. Window unit 501 is preferably an insulated window including a pair of spaced glass panes 533 and 542 and a variable transmission window element 541 positioned between inner pane 542 and outer pane 533. Cement 540 or other supporting structures may be provided between panes 533 and 542 to provide an airtight chamber in which an insulating gas such as Argon may be contained and to maintain spacing and structure integrity of window unit 501. Variable transmission window element 541 is preferably, but not necessarily, electrochromic and is shown as including a first conductive clip 536 and a second conductive clip 548 each secured to the edges of a respective one of a pair of transparent elements 504 and 506. A gold-plated contact pad 539 may also be provided at the edge of window unit 501 and is connected to clip 536 by a connector wire 535. Another contact pad and wire (not shown) are used to provide a connection to clip 548. Window unit 501 may optionally have any of the constructions, but is not limited to these constructions, described in commonly assigned U.S. Pat. No. 6,407,847, entitled "ELECTROCHROMIC WINDOWS AND METHOD OF MANUFACTURING THE SAME." The entire disclosure of that patent is incorporated herein by reference.

As shown in FIG. 5A, terminal 43 is connected to a metal pad 528 and the illustrated contact assembly extends the connection to conductive clip 536 in variable transmission window element 541. In detail, contact assembly 502 includes a probe assembly 525 having an insulating, plastic sleeve 527 and a metal sleeve 554, which is necked at end 553 to retain a plunger 526 and which also has a small flange so that it does not slide into the clearance hole in the end of plastic sleeve 527. Metal sleeve 554 is swaged to a smaller diameter at its opposite end to retain a ball 524. A helical compression spring 522 (the wires of which are shown in cross-sectioned view) creates a separating force and a reliable conducting path between plunger 526 and ball 524. This separating force should be at least several hundred grams. Plunger 526 has a head 555 which is enlarged in diameter to provide a smooth sliding fit in metal sleeve 554 to retain plunger 526 from coming out of the necked end 553 of metal sleeve 554. Head 555 has a conical top to center spring 522.

Contact assembly 502 further includes a plunger assembly 530 having a similar construction as probe assembly 525. Plunger assembly 530 includes a metal sleeve 521, which has a larger flange 537 that bears against a plastic insulating flanged sleeve 538 and prevents metal sleeve 521 from sliding further into plastic sleeve 538. Plunger assembly 530 extends through a cross hole in plastic sleeve 527 of probe assembly 525. The cross hole prevents plunger assembly 530 from being pushed away by side pressure exerted by ball 524 of probe assembly 525, which presses against it. Contact assembly 502 provides a reliable contact path from pad 528 to plunger 526; to helical spring 522; to ball 524; to metal sleeve 523; to the ball, helical spring, and plunger of plunger assembly 530; to contact pad 539; to connecting wire 535; and finally to contact clip 536 of variable transmission window element 541. Flange 552 may include an index notch 551, the position of which is used to indicate proper rotational alignment of the sleeve 527 to insert plunger assembly 530 during the assembly process. Note that in the application, flange 552 of insulating sleeve 527 and the flange on insulating sleeve 538 and the cylindrical surfaces of the sleeves and holes adjoining these flanges bear the necessary mechanical loads so the contact assembly will work quite well in a hollow extruded aluminum or hollow plastic sash. Also, the contact is fully insulated from a metal sash.

A second, preferably identical, contact assembly makes contact to a pad similar to pad 539 which is attached to contact clip 548. This assembly is typically spaced, for example, about 1 inch away and would be visible in another cross section through the window.

Each of the contacting members is preferably nickel plated with gold plating over the top. The helical springs are preferably of low resistivity tempered beryllium copper alloy so that resistance through the length of the coil is small. The total resistance through the contact path should preferably not exceed several tenths of an ohm. The helical spring and plunger assembly is chosen because for long-term reliable operation, a relatively high contact force should be maintained. Plunger 534 must travel a number of tenths of an inch to cover normal tolerances for the positioning of window unit 501 in sash 543. Likewise, plunger 526 must travel a number of tenths of an inch to allow for tolerances in the closed position of the window. Furthermore, adequate contact force must be maintained over the plunger travels expected for this full tolerance range. The helical spring is one of the most efficient ways of utilizing a structural member to store elastic energy. To keep size relatively small, stress levels low enough to minimize relaxation and fatigue, and contact forces high and uniform, the efficiencies of this near optimal structure are highly desirable if not absolutely necessary. In principle, good contact can be made between gold-plated members with very low contact forces; but, with the expectation to maintain the contact over many years with no special cleaning, higher forces are certainly desirable if not an absolute practical requirement. Optionally, the geometries of the contacting plunger tips may be made more pointed or changed in other ways. More pointed tips will pierce through obstructions more effectively, but will cause more damage to mating contacts. A discussion of other portions and features of the assembly follows.

A fragmentary view of an alternate flanged sleeve 550 which may be used in place of flanged sleeve 527 is shown in FIG. 5B. To use flanged sleeve 550, a larger hole is drilled in the sash 545, which is shown in fragmentary view. An added ledge 546 in flanged sleeve 550 registers the sleeve in the larger hole and provides clearance space 544 between an outer surface 547 of sleeve 550 and the hole in sash 545. This allows clearance for sleeve 550 to tip slightly so that plunger 530 may be inserted through the cross hole. With this arrangement, hole 529 and enlarged cross hole 531 in the window sash do not need to intersect exactly.

It is necessary to make convenient, reliable contact to both opening and non-opening variable transmission windows. FIGS. 5C-5E are directed particularly to non-opening windows with an optional but preferred hollow metal frame. Note that many features of the assembly depicted in FIGS. 5C-5E including the hollow metal frame may be applied to opening window assemblies as well and such applications are within the scope of this invention. Also, many of the features applied in illustrative embodiments for opening windows also apply for non-opening window assemblies as well and such applications are also within the scope of this invention. Contact assembly 502c shown in cross-sectional view is very similar to the assembly described in detail in FIG. 5A and other features of FIGS. 5C-5E are similar to corresponding features for the casement window described in FIG. 6. Details of construction common to and described in either of these related descriptions will not be repeated here. Probe 526c has been elongated to accommodate the added depth of the frame 543c. Note that insulating sleeves 527c and 538c electrically isolate the contact assembly 502c from the hollow metal frame 543c in which it is mounted. Contact probe sub-assembly 598c passes through hole 599c in plastic sleeve 527c and is restrained by sleeve 527c from being pushed out of place by pressure from probe sub-assembly 579c. Retaining flange 552c of sleeve 527c is recessed in a counter bored hole in face 582c of frame 543c so that the face plate 597e (FIG. 5E) can be mounted directly on the surface of face 582c of the frame. The retaining force is generated between sub-assembly 598c as it bears on the hole 599c and the flange 522c as it bears against the ledge in the counter bored hole in the face 582c of frame 543c. Probe 526c may have a contact point 585c which in operation engages connecting pad 587d (FIG. 5D). The probe tips 585c and 586c are shown in their normal operating positions when depressed against contact pads 587d and 588d, respectively, with module 578d-e mounted in its installed position on the face 582c of frame 543c. In the free position, the springs of the respective probe sub-assemblies force the probes to slide out so that they protrude from the face of 582c of the frame 543c. Holes 583c are preferably threaded holes provided to attach module 578d-e (FIGS. 5D and 5E). Index notch 551c is provided to indicate proper orientation of sleeve 527c to accommodate insertion of probe sub-assembly 598c during the assembly process. The contact assembly 584c is similar to the assembly 579c just described.

FIG. 5D depicts the back of the control module which contains the circuit disclosed in FIGS. 3A-3B. Lead wire 160d corresponds to terminal 1 and lead wire 161d corresponds to terminal 2, contact pad 587d corresponds to terminal 43 and contact pad 588d corresponds to terminal 45 of FIG. 3B. 589d is preferably a portion of a relatively thin, flexible, printed circuit board containing pad 587d exposed and preferably gold plated on its front surface as shown in FIG. 5D. Pad 587d is insulated from the back of face plate 597d and the printed circuit board 589d containing pad 587d is preferably bonded to 597d. 590d is the connecting strip, preferably insulated on both sides, which connects the contact pad 587d with its associated circuit. Pad 588d is similarly constructed.

Connecting wires corresponding to signal paths 1004 and 1005 of FIG. 1 (not depicted in FIGS. 5C-5E) are normally fished from the wall, through a hole into the frame 543c at a place not visible in the room and pulled out of opening 581c and attached to leads 160d and 161d. Optionally, the leads 160d and 161d may be replaced by a screw type or other type of connector. After connection of the wires, the unit 578d is turned 180 degrees from the position shown in FIG. 5D to the position shown in FIG. 5E. The wires are tucked back into the hole 581c and the body 591d of the module is inserted in hole 581c. Screws are then inserted in countersunk holes 596e and tightened into threaded holes 583c to secure the module in its operating position. The contact sub-assembly 579c maintains pressure between pad 587d and the wall of probe sub-assembly 598c to complete one of the conducting paths to the variable transmission window which corresponds to element 44 of FIG. 3A. A similar probe sub-assembly in contact assembly 584c completes the other connecting path to the variable transmission window element. 593e is an optional display as indicated in 47a-b of FIG. 1; 594e is an optional keypad as indicated in 46a-b of FIG. 1; and 595e is an optional receiver and/or transmitter for a remote interface as indicated in 51a-b of FIG. 1.

The module is easy to connect to the variable transmission window, may normally be placed where it is a convenient control interface to the user, is accessible for repair or upgrade, and may be neat in appearance.

Figure 6:
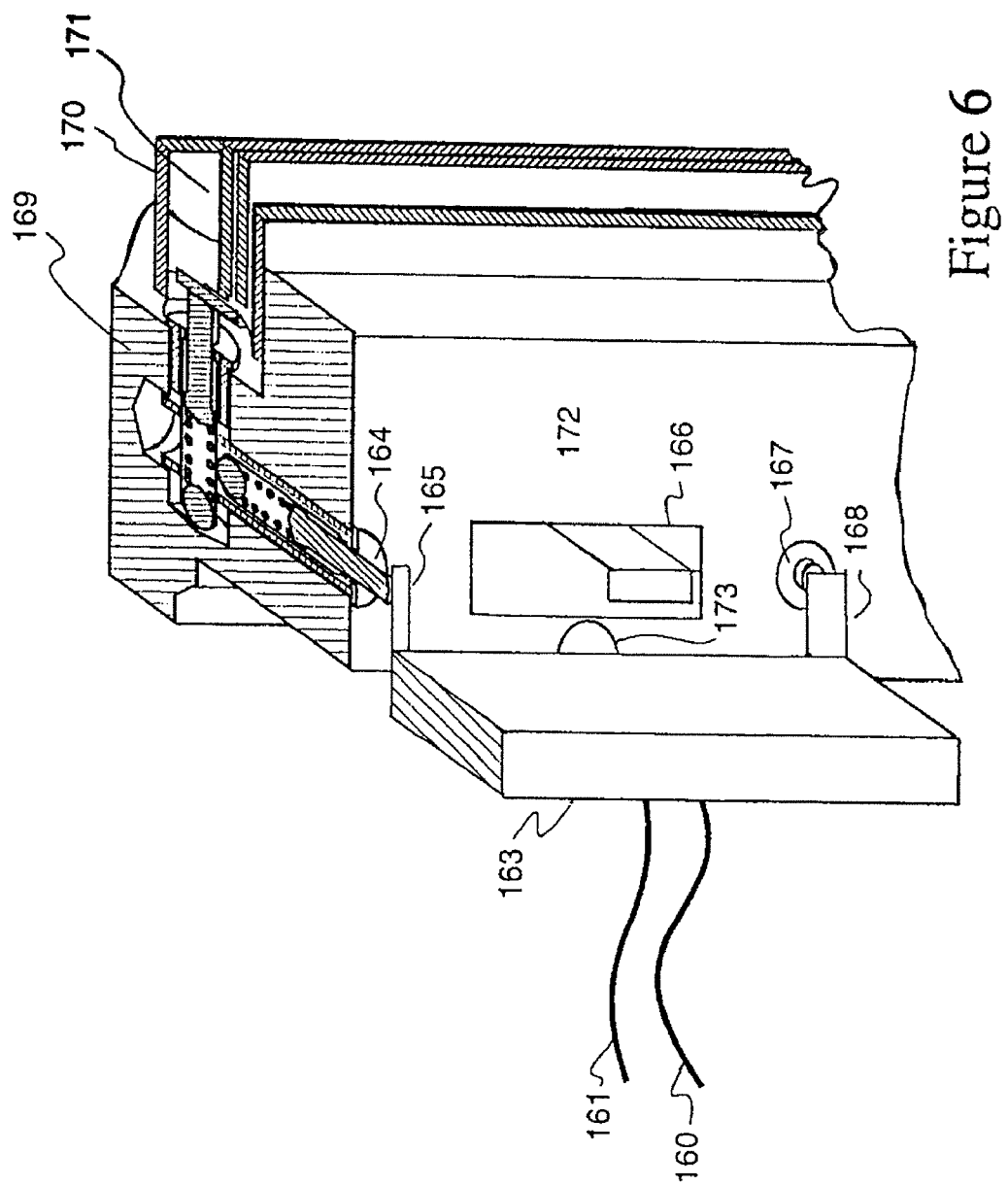
FIG. 6 is an isometric view shown in partial cross section illustrating a casement window construction utilizing the electrical connection shown in FIG. 5A.

FIG. 6 depicts an application of two of the contact assemblies depicted in FIG. 5A and of the circuit of FIG. 3A for a hinged or casement window. A module 163 is provided on a fixed window frame for housing the circuit of FIG. 3A. In FIG. 6, lead wire 160 corresponds to terminal 1, lead wire 161 to terminal 2, terminal contact pad 165 to terminal 43, and terminal contact pad 168 to terminal 45. Portion 172 of the vertical portion of window sash 169 includes a contact assembly 164 like that shown in FIG. 5A and, additionally, a second similar contact assembly 167, a magnet 173, and the catch for the window latch 166. A variable transmission window assembly 170 is mounted in sash 169 that contains variable transmission element 171. The sectioned contact assembly 164 contacts a pad 165 when the window is closed. Pad 165 is coupled to the circuit in module 163. The second identical contact assembly 167 contacts a pad 168 when the window is closed and connects to the other terminal of variable transmission window element 171. Pad 168 is coupled to the circuit in module 163. Element 166 is the catch for the window latch assembly and is attached to window sash 169. The mating latch which attaches to the frame in which the window sash 169 is hinged is not shown.

Module 163 is small and is shown in a preferred position where it may be recessed in the fixed frame in which sash 169 is hinged and hidden from view by being covered by the window latch assembly. In this position, it is out of sight but reasonably accessible for repair. As discussed above with respect to FIG. 3A, module 163 optionally contains a magnetically actuated reed switch that is closed when the window is closed by bringing the reed switch into close proximity with magnet 173 which is embedded in the window sash 169. Other magnetic sensors may optionally be used in place of the reed switch.

Figure 7:
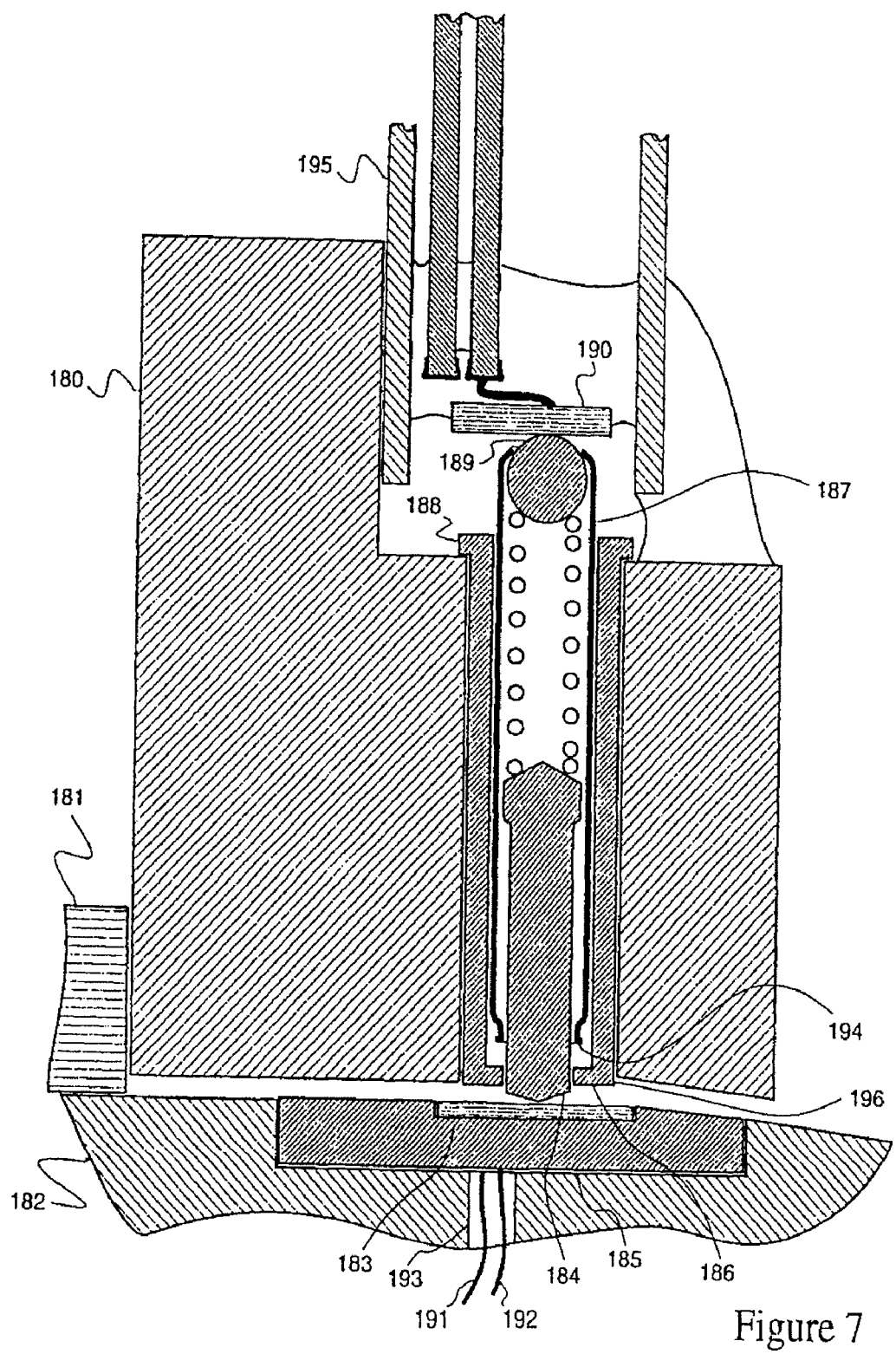
FIG. 7 is a cross-sectional view of an electrical connection for a window construction according to a second embodiment of the present invention.

FIG. 7 shows a cross section of a sash 180 of a sliding window or door. This includes double hung windows and windows or doors which slide in a horizontal direction. In FIG. 7, member 182 is the portion of the frame against which the window closes and member 181 is another portion of the frame. There are many similarities to the application of FIG. 6, so fewer details are given. Probe assembly 187 is similar to probe assembly 125 of FIG. 5, but with its length adjusted to suit the application. Probe assembly 187 fits in an insulating plastic sleeve 196, which has an external flange 188 at its upper end to retain it in sash 180 and a section of reduced internal diameter 186 to retain probe assembly 187. Probe assembly 187 includes a probe 184 that is sized to slide freely so that it telescopes to exert force between a ball 189 and a pad 190 on the one end and between probe 184 and a pad 183 on the other. The construction shown in FIG. 7 further includes a module 185 in which the circuit of FIG. 3A may be housed. Module 185 is recessed in the window frame member 182 and except for a difference in the placement of the two contact pads of which pad 183 is one, module 185 is very similar to module 163 of FIG. 6. A pair of wires 191 and 192 is provided for electrical connection to the two-wire bus, and the first pad 183 and the second pad (not visible in the cross section) are for connection to a variable transmission window element in window assembly 195. A magnet, not shown, may be embedded in the window sash and actuate an optional magnetic sensor in module 185 when window sash 180 is closed.

The embodiments depicted in FIGS. 6 and 7 have the advantage of requiring no flexible wires attached between the moving window sash and the fixed frame, but have the disadvantage of losing connection when the window sash is open. The embodiment shown in FIGS. 8A and 8B is intended to maintain the ease of assembly for the installer or manufacturer and to provide continuous connection regardless of whether the window is open or closed. The window assembly shown in FIGS. 8A and 8B includes a flat, flexible, two conductor cable 246 having a sharp fold with a strain relief at 253. Cable 246 attaches to a small circuit board 243, which is fastened to the hinged side edge of window sash 247. The other end of cable 246 attaches to circuit module 248, which is recessed in the window frame in the area which adjoins the hinged side of window sash 247 when the window is closed. The fold in cable 246 opens and extends rather like a single fold in an accordion bellows when the window is opened and stays neatly in the hinged area. Circuit board 243 has two gold-plated pads 242 and 244 on its under side, each of which is connected, respectively, to one of the cable conductors serving as permanent contact pads for contact probe assemblies, which are similar to these described in FIG. 7. One of the two probe assemblies having probe 241 which contacts pad 242 is shown in section 255.

An embodiment for a double hung window may replace the cords in the conventional block and tackle style lift assemblies with conductors which are flexible enough to take repeated flexing around the small diameter pulleys in the lift mechanism. If cable with straight conductors of small enough diameter is not practical for a given window construction, options are to use a sandwich with a ribbon of very thin conductive, preferably copper, strip to replace the cord or to use a cable where the conductor is wrapped in a helix around the cord having the required tensile strength. This configuration has the disadvantage that the two connections would normally need to be made on opposite sides of the window, one through each of the adapted lift mechanisms. Four pulleys are common in standard lift mechanisms so one end of the cord attaches to the window and the other end to the double pulley which is attached to the spring. It is preferred to use an odd number of pulleys, one or three for example, and attach one end of the conducting cord to the window sash and the other to the stationary window frame where electrical connection could more conveniently be made from it to the module. A better alternative is to use a single, longer spring with a material of adequate conductivity without the block and tackle pulleys and to make connection to the module at the stationary end of the spring and to the window sash at the moving end of the spring. The spring may be of beryllium copper or preferably of a lower cost alloy that has reasonable spring properties. A wire with a copper core and a cladding of a stronger more creep resistant material would be ideal.

Figure 9:
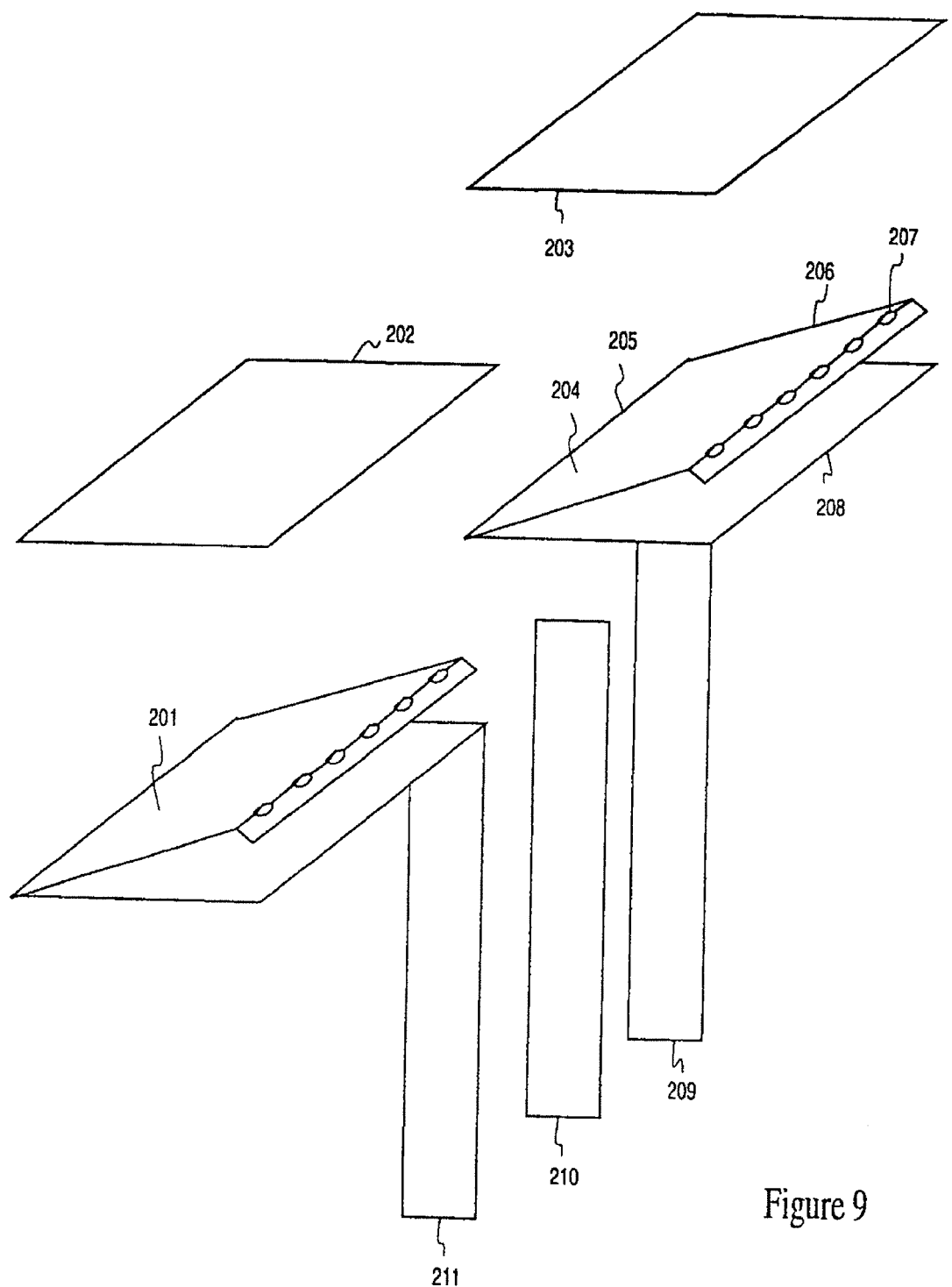
FIG. 9 is an exploded isometric view of an electrical plug used in a connection for a window construction according to a fourth embodiment of the present invention.

In an alternate construction shown in exploded view in FIG. 9, a contact leaf spring member 204 is provided having an extended tab 209, which is bonded to an insulating separator 210. A second contact leaf spring member 201 having a mirror image of member 204 is also provided and has an extended conductive tab 211, which is bonded to the opposing side of insulating separator 210. The sandwiched tab assembly passes through a hole in the window sash to engage and make contact with a receptacle such as that shown in FIG. 10 when the window is closed or to make permanent contact in a non-opening window assembly. Contact 204 sits with dimpled contact area 207 toward the inner side of a recess in the window sash in which the window is glazed and a connector pad 203 is part of the window assembly similar to pad 139 of FIG. 5A, but nearly flush with the edge of the glass panes. Surface 208 of contact 204 bears against the outer side of the recess in which the window is glazed and cantilevered blade 206 is folded back in a radiused bend at 205. The configuration should be such that the surface of blade 6 forms a smooth ramped surface that will not snag the window as it is placed in the sash in preparation for glazing. Contact member 201 makes connection with another terminal pad 202 which is similar in design to pad 203.

Figure 10:
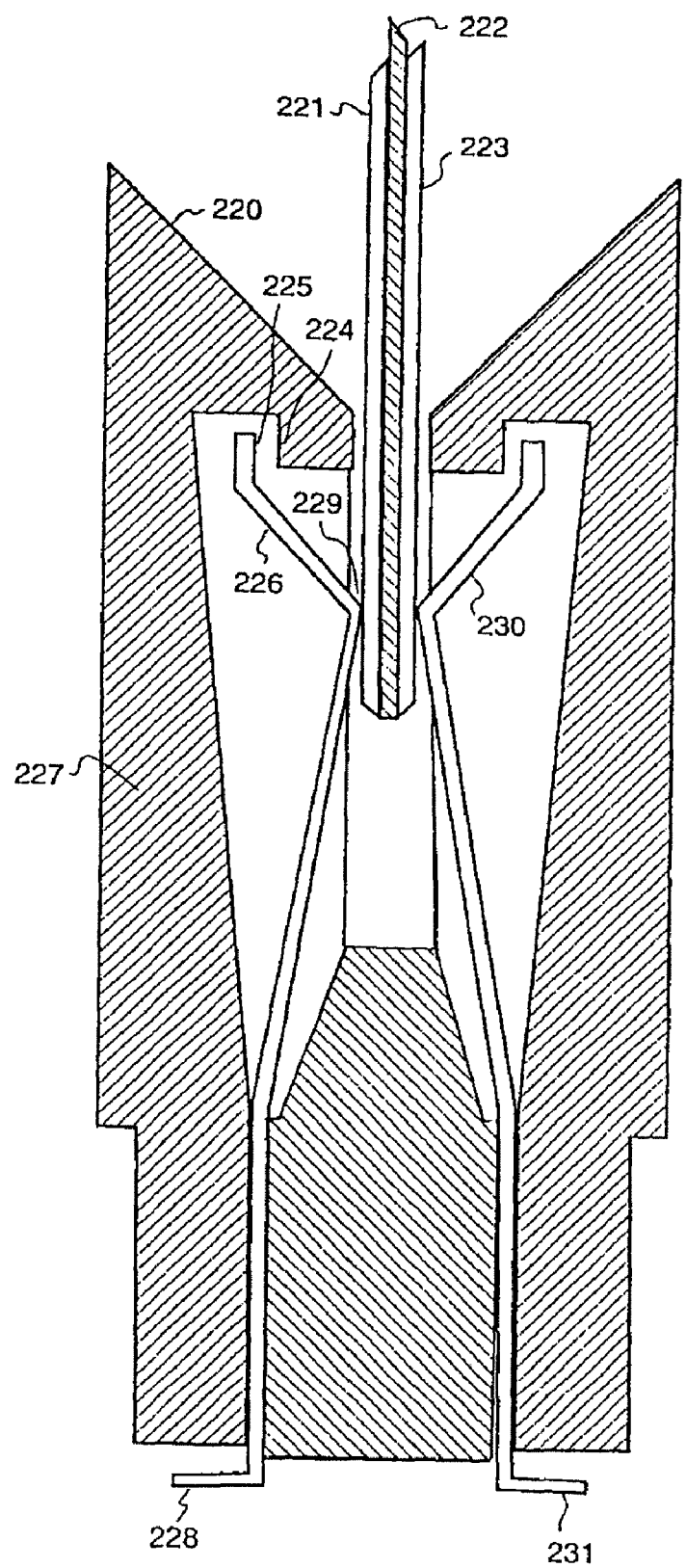
FIG. 10 is a cross-sectional view of the electrical connection used in the window construction according to the fourth embodiment of the present invention.

The assembly of FIG. 10 depicts a receptacle 229 mated with a fragmentary portion of a plug. The plug consists of mating conductors 221 and 223, which may be the ends of the sandwiched tabs on the contacts shown in FIG. 9, and an insulator 222, which may be the end of insulating strip 210 also shown in FIG. 9. These components form the plug which is shown mated with the receptacle in FIG. 10. The receptacle includes an insulating body 227 that is preferably round in outer profile with a smaller diameter section secured into the window sill and a larger diameter portion extending into a larger diameter hole in the window sash. The round profile matches more naturally with holes which can be readily put in window structural members to secure the receptacle in the stationary window frame and to allow clearance for the receptacle and plug in the window sash. The "V" shaped section 220 guides the plug into place when the window is closed. The slot and "V" shaped guide should be open at the sides so that the plug assembly can preferably be wider than the receptacle assembly. In any event, greater lateral misalignment can be provided for if the width of the plug does not have to fit within the diameter of the receptacle. The hole in the sash should have generous clearance so that for normal window tolerances, the receptacle will not jam against the sash as the window is closed. Tabs 224 allow resilient contact blades 226 and 230 to be pre-loaded and maintained without shorting when the window is opened and the plug assembly withdrawn. Leads of contact blades 226 and 230 are attached to tabs 228 and 231, respectively.

The above description is considered that of the preferred embodiments only. Modifications of the invention will occur to those skilled in the art and to those who make or use the invention. Therefore, it is understood that the embodiments shown in the drawings and described above are merely for illustrative purposes and are intended to be included within, but not intended to limit the scope of the invention, which is defined by the following claims as interpreted according to the principles of patent law, including the doctrine of equivalents.

The invention claimed is:

1. An electrical control system configured to control a transmittance of a plurality of variable transmittance windows, said electrical control system comprising:
   a master unit configured to supply first control signals that are capable of changing the transmittance of the variable transmission windows;
   a plurality of window control units coupled to said master unit configured to supply second control signals for controlling the transmittance of at least one of the respective variable transmission windows in response to said first control signals or said second control signals
   a light sensor coupled to said master unit and configured to input light data as to sensed light, wherein said control signals are based upon said light data; a temperature sensor coupled to said master unit and configured to input temperature data as to sensed temperature; and
   wherein said first control signals from said master unit can override said second control signals for controlling the transmittance of the variable transmission windows;
   a light sensor coupled to said master unit and configured to input light data as to sensed light, wherein said control signals are based upon said light data; a temperature sensor coupled to said master unit and configured to input temperature data as to sensed temperature; and
   wherein said first control signals from said master unit can override said second control signals for controlling the transmittance of the variable transmission windows.

2. The electrical control system of claim 1, wherein said light sensor coupled to said master unit comprises said light sensor integrated with said master unit.

3. The electrical control system of claim 1, wherein said light sensor coupled to said master unit comprises said light sensor integrated with one of said plurality of window control units and in communication with said master unit.

4. The electrical control system of claim 1, wherein said temperature sensor coupled to said master unit comprises said temperature sensor integrated with said master unit.

5. The electrical control system of claim 1, wherein said temperature sensor coupled to said master unit comprises said temperature sensor integrated with one of said plurality of window control units and in communication with said master unit.

6. The electrical control system of claim 1, wherein said master unit is further configured to delay a changing of the transmittance of a portion of the plurality of variable transmittance windows.

7. The electrical control system of claim 1, wherein at least a portion of said plurality of window control units is assigned a unique address, such that said master unit is further configured to individually control each of said window control units that are assigned said unique address.

8. The electrical control system of claim 1, wherein said light sensor is an active pixel sensor.

9. The electrical control system of claim 1 further comprising a remote interface unit in communication with said master unit, wherein said remote interface unit is configured for intrusion detection, such that an occupant of a room is detected.

10. An electrical control system configured to control a transmittance of a plurality of variable transmittance windows, said electrical control system comprising:
- a master unit configured to supply first control signals that are capable of changing the transmittance of the variable transmittance windows; and
- a plurality of window control units coupled with said master unit, such that each of the plurality of window control units operate to control a respective one of the variable transmittance windows for varying the window transmittance in response to a second control signal received from one of said plurality of window control units, at least a portion of said plurality of window control units comprising at least one of:
- a light sensor configured to input light data as to sensed light, wherein said control signals are based upon said light data; and
- a temperature sensor configured to input temperature data as to sensed temperature, wherein said control signals are based upon said temperature data; and
- wherein the first control signals from said master unit have priority over said second control signal for controlling the transmittance of the variable transmittance windows.

11. The electrical control system of claim 10, wherein said master unit is further configured to delay a changing of the transmittance of a portion of the plurality of variable transmittance windows.

12. The electrical control system of claim 10, wherein at least a portion of said plurality of window control units is assigned a unique address, such that said master unit is further configured to individually control each of said window control units that are assigned said unique address.

13. The electrical control system of claim 10, wherein said light sensor is an active pixel sensor.

14. The electrical control system of claim 10 further comprising a remote interface unit in communication with said master unit, wherein said remote interface unit is configured for intrusion detection, such that an occupant of a room is detected.

15. An electrical control system configured to control a transmittance of a plurality of variable transmittance windows, said electrical control system comprising:
- a master unit configured to supply a first control signal for changing the transmittance of the variable transmittance window;
- a plurality of window control units coupled with said master unit, wherein at least one of the plurality of window control units is configured to supply a second control signal for controlling a respective one of the window transmittance of at least one of the variable transmittance windows in response to both the first control signal received from said master unit and said second control signal, and each of said plurality of window control units is assigned a unique address, such that said master unit is configured to individually control each of said window control units that are assigned said unique address; and
- wherein the first control signal from said master unit can override said second control signal from one of the plurality of window control units for controlling the transmittance of at least one of said variable transmission windows.

16. The electrical control system of claim 15 further comprising a light sensor coupled to said master unit either directly or through one of said plurality of window control units, such that said control signals are based upon light sensed by said light sensor.

17. The electrical control system of claim 15 further comprising a temperature sensor coupled to said master unit either directly or through one of said plurality of window control units, such that said control signals are based upon temperature sensed by said temperature sensor.

18. The electrical control system of claim 15, wherein said master unit is configured to delay a changing of the transmittance of a portion of the plurality of variable transmittance windows.

19. The electrical control system of claim 15 further comprising a remote interface unit in communication with said master unit, wherein said remote interface unit is configured for intrusion detection, such that an occupant of a room is detected.

20. The electrical control system of claim 15, wherein said light sensor is an active pixel sensor.

* * * * *

UNITED STATES PATENT AND TRADEMARK OFFICE
CERTIFICATE OF CORRECTION

| | |
|---|---|
| PATENT NO. | : 8,219,217 B2 |
| APPLICATION NO. | : 12/884852 |
| DATED | : July 10, 2012 |
| INVENTOR(S) | : Jon H. Bechtel et al. |

Page 1 of 1

It is certified that error appears in the above-identified patent and that said Letters Patent is hereby corrected as shown below:

In the claims

Column 20, lines 28-35 should be deleted.

Signed and Sealed this
First Day of December, 2015

Michelle K. Lee
*Director of the United States Patent and Trademark Office*